US010333797B2

(12) United States Patent
Wang et al.

(10) Patent No.: US 10,333,797 B2
(45) Date of Patent: Jun. 25, 2019

(54) CENTRALIZED TROUBLESHOOTING TOOL IN DISTRIBUTED VIRTUAL NETWORK

(71) Applicant: Nicira, Inc., Palo Alto, CA (US)

(72) Inventors: Xin Wang, Beijing (CN); Yusheng Wang, Beijing (CN); Jianjun Shen, Beijing (CN); Donghai Han, Beijing (CN); Hua Wang, Beijing (CN); Chidambareswaran Raman, Sunnyvale, CA (US); Akhila Naveen, Palo Alto, CA (US); Raju Koganty, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 775 days.

(21) Appl. No.: 14/839,075

(22) Filed: Aug. 28, 2015

(65) Prior Publication Data

US 2017/0063642 A1 Mar. 2, 2017

(51) Int. Cl.
*H04L 12/24* (2006.01)
*H04L 29/08* (2006.01)

(52) U.S. Cl.
CPC .......... *H04L 41/26* (2013.01); *H04L 41/0879* (2013.01); *H04L 67/2842* (2013.01); *H04L 41/22* (2013.01)

(58) Field of Classification Search
CPC .................. H04L 41/5035; H04L 43/045
See application file for complete search history.

(56) References Cited

U.S. PATENT DOCUMENTS

| | | |
|---|---|---|
| 6,363,495 B1 | 3/2002 | Mackenzie et al. |
| 7,668,100 B2 | 2/2010 | Balasaygun et al. |
| 7,778,623 B2 | 8/2010 | Araki et al. |
| 8,402,442 B1 | 3/2013 | Chan et al. |
| 8,953,432 B2 | 2/2015 | Ansari et al. |
| 9,292,371 B1 | 3/2016 | Clifford |
| 9,313,236 B2 | 4/2016 | Herzog et al. |
| 9,443,208 B2 | 9/2016 | Gonzalez et al. |
| 2001/0034859 A1 | 10/2001 | Swoboda et al. |
| 2002/0152446 A1 | 10/2002 | Fleming |
| 2004/0010716 A1 | 1/2004 | Childress et al. |
| 2004/0010778 A1 | 1/2004 | Kaler et al. |
| 2007/0112954 A1 | 5/2007 | Ramani et al. |
| 2007/0113218 A1 | 5/2007 | Nolan et al. |

(Continued)

OTHER PUBLICATIONS

Wu, Wenfei, et al., "Virtual Network Diagnosis as a Service," SoCC'13, http://dx.doi.org/10.1145/2523616.2523621, Oct. 1-3, 2013, 15 pages, ACM, Santa Clara, CA, USA.

*Primary Examiner* — Douglas B Blair
*Assistant Examiner* — Christopher P Cadorna
(74) *Attorney, Agent, or Firm* — Adeli LLP

(57) ABSTRACT

A novel centralized troubleshooting tool that enables user to troubleshoot a distributed virtual network with a single consistent user interface is provided. The distributed virtual network being monitored or debugged by the centralized troubleshooting tool includes different types of logical resources (LRs) that placed or distributed across different physical endpoints (PEs). The centralized troubleshooting tool provides functions that allow the user to invoke commands on different physical endpoints in order to collect information about the logical resources running in those physical endpoints. This allows the user to compare and analyze the information from different PEs for a same LR.

23 Claims, 20 Drawing Sheets

(56) References Cited

U.S. PATENT DOCUMENTS

| | | |
|---|---|---|
| 2012/0110173 A1 | 5/2012 | Luna et al. |
| 2012/0331087 A1 | 12/2012 | Luna et al. |
| 2014/0066063 A1 | 3/2014 | Park |
| 2014/0096066 A1* | 4/2014 | Auvenshine ........ G06F 9/45512 715/780 |
| 2015/0043378 A1* | 2/2015 | Bardgett ............. H04L 12/4641 370/254 |
| 2015/0341447 A1 | 11/2015 | Patil et al. |
| 2016/0117213 A1 | 4/2016 | Arjun et al. |
| 2016/0147637 A1* | 5/2016 | Bhagavan ......... G06F 17/30424 717/127 |
| 2017/0060665 A1 | 3/2017 | Wang et al. |
| 2017/0063651 A1 | 3/2017 | Wang et al. |

* cited by examiner

Logical Switch DB Services

511

| Service Description | Input | Output |
|---|---|---|
| List all logical switches | None | All logical switch summary |
| List hosts that can be connected to a logical switch | VNI of a logical switch | All logical switch summary |
| List logical switches that can be connected to a host | Host ID or host IP | Logical switch summary attributes |
| List all controllers | None | All controller summary attributes |

Logical Switch Controller Services

512

| Service Description | Input | Output |
|---|---|---|
| Display master controller of a logical switch | VNI of logical switch | Summary of master controller of logical switch |
| List VTEP IPs of a Logical switch on master controller | VNI of a logical switch | List of VTEP summary attributes |
| List MAC addresses of a logical switch on master controller | VNI of a logical switch | List of MAC address summary attributes |
| List ARP of a logical switch on master controller | VNI of a logical switch | List of ARP summary attributes |
| List VTEP IPs of a logical switch on a specified controller | VNI of a logical switch & ID/IP of a controller | List of VTEP summary attributes |
| List MAC addresses of a logical switch on a specified controller | VNI of a logical switch & the ID/IP of a controller | List of MAC summary attributes |
| List ARPs of a logical switch on a specified controller | VNI of a logical switch & the ID/IP of a controller | List of ARP summary attributes |
| List VTEP IPs of a connected host on a specified controller | VNI of a logical switch & ID/IP of a controller | List of VTEP summary attributes |
| List MAC addresses of a connected host on a specified controller | VNI of a logical switch & the ID/IP of a controller | List of MAC summary attributes |
| List ARPs of a connected host on a specified controller | VNI of a logical switch & the ID/IP of a controller | List of ARP summary attributes |

*Figure 5a*

Logical Switch Host Services

513

| Service Description | Input | Output |
|---|---|---|
| Display all logical switches on a host | The host ID/IP | All logical switch summary attributes |
| List VTEP IPs of a logical switch on a specified host | The host ID/IP; the VNI of a logical switch | List of VTEP summary attributes |
| List MAC addresses of a logical switch on a specified host | The host ID/IP; the VNI of a logical switch | List of MAC address summary attributes |
| List ARPs of a logical switch on a specified host | The host ID/IP; the VNI of a logical switch | List of ARP summary attribute |

*Figure 5b*

Logical Router DB Services

521

| Service Description | Input | Output |
|---|---|---|
| List of logical routers | None | All logical router summary attributes |
| List hosts that can be connected to a logical router | The name or ID of a logical router | Host summary attributes |
| List logical routers that can be connected to a host | Host ID or host IP | Logical router summary attributes |

Logical Router Controller

| Service Description | Input | Output |
|---|---|---|
| Display master controller of a logical router | Name/ID of specified logical router | Summary of master controller of logical Router |
| Display logical router information on mater controller | Name/ID of a specified logical router | Logical router summary attributes |
| List interfaces of logical router on master controller | Name/ID of a specified logical router | All interface summary attributes of the specified logical router |
| List bridges of a logical router on master controller | Name/ID of a specified logical router | All bridge summary attributes |
| List routes of a logical router on master controller | Name/ID of a specified logical router | All static routes summary attributes |
| Display logical router information on a specified controller | Name/ID of a specified logical router & the ID/IP of a controller | Logical router summary attributes |
| List interfaces of a logical router on a specified controller | Name/ID of a specified logical router & the ID/IP of a controller | All interface summary attributes of a specified logical router |
| List bridges of a logical router on a specified controller | Name/ID of a specified logical router & ID/IP of a controller | All bridge summary attributes |
| List routes of a logical router on a specified controller | Name/ID of a specified logical router & the ID/IP of a controller | All static routes summary attributes |

523

Logical Router Host Services

| Service Description | Input | Output |
|---|---|---|
| Display logical Routeres information on a specified host | Name/ID of a specified logical router; host ID/IP | Logical Router summary attributes |
| List interfaces of a logical router on a specified host | Name or ID of a specified logical router | All interface summary attributes of a specified logical router |
| List bridges of a logical router on master controller | Name or ID of a specified logical router | All bridge summary attributes |
| List routes of a logical routes on master controller | Name or ID of a specified logical router | All static routes summary attributes |

*Figure 6b*

701 ```
> show logical-switch controller 10.111.10.132 vni 5000 mac
VNI    MAC                VTEP-IP          Connection-ID
5000   00:0c:29:63:8a:36  10.160.79.62     2
5000   00:0c:29:44:97:97  10.161.4.79      4
```

702 ```
> show logical-switch host 10.160.65.238 vni 5000 mac
VNI    MAC                VTEP-IP          Connection-ID
5000   00:0c:29:44:97:97  10.161.4.79      4
```

703 ```
> show logical-switch controller 10.111.10.132 vni 5000 mac
VNI    MAC                VTEP-IP          Connection-ID
5000   00:0c:29:63:8a:36  10.160.79.62     2
5000   00:0c:29:44:97:97  10.161.4.79      4
```

704 ```
> show logical-switch controller controller-1 vni 5000 mac
VNI    MAC                VTEP-IP          Connection-ID
5000   00:0c:29:63:8a:36  10.160.79.62     2
5000   00:0c:29:44:97:97  10.161.4.79      4
```

705 ```
> show logical-switch controller master vni 5000 mac
VNI    MAC                VTEP-IP          Connection-ID
5000   00:0c:29:63:8a:36  10.160.79.62     2
5000   00:0c:29:44:97:97  10.161.4.79      4
masterControllerIP = 10.111.10.132
```

706 ```
> show logical-router controller master dlr edge-2 brief
LR-ID     LR-name         Universal   Service-Controller   Egress-locale
0x1388    default+edge-2  false       10.111.10.132        local
masterControllerIP= 10.111.10.132
```

*Figure 7*

CENTRALIZED TROUBLESHOOTING TOOL IN DISTRIBUTED VIRTUAL NETWORK

BACKGROUND

While distributed architecture is highly successful in achieving scaling and performance, it introduces significant troubleshooting issues. In a distributed virtual network environment, the network infrastructure comprises different logical resources (LR) and different types of physical endpoints (PE). The typical situation in this distributed virtual network is that a logical resource (such as a logical switch or router) may physically span multiple physical endpoints. While this distributed structure enhances the availability and scalability of the LRs, it often introduces difficulty when one has to troubleshoot or debug the system.

While it is easy to extend and scale a logical network that is distributed over a physical network, it may be difficult to troubleshoot the logical network when fault occurs. Typically, a user has to log into different physical endpoints to troubleshoot the distributed system. This can be difficult for the user for the following reasons: (1) it is difficult for the user to remember different user passwords for different PEs; (2) it is difficult for the user to remember which logical resources are in which PEs; (3) it is difficult for the user to remember which terminal (for CLI) or window (for GUI) is connected to which PE; (4) the command history in different terminals can not be reused; and (5) IP addresses are mostly meaningless to a human user and hard to memorize or analyze.

SUMMARY

Some embodiments provide a centralized troubleshooting tool (CTT) that enables user to troubleshoot a distributed virtual network with a single consistent user interface. The distributed virtual network being monitored or debugged by the centralized troubleshooting tool includes different types of logical resources (LRs) that are placed or distributed across different physical endpoints (PEs). In some embodiments, the centralized troubleshooting tool provides functions that allow the user to invoke commands on different physical endpoints in order to collect information about the logical resources running in those physical endpoints. This allows the user to compare and analyze the information from different PEs for a same LR.

Some embodiments provide an intelligent CLI that facilitates the troubleshooting of a distributed network by generating and inserting entries into the command history cache. These generated entries were never entered by the user but were created by the CLI and inserted into the command history cache for the user to use. In some embodiments, the CLI allows users to enter commands by using command prototypes that are easier to comprehend for human operators. The intelligent CLI in turn resolves the command prototypes into commands with actual identifiers of LRs and PEs. These resolved commands (with the actual identifiers of LRs and PEs) are inserted into the command history cache for use/re-use by the user.

In some embodiments, the intelligent CLI preload the command history cache with a set of predetermined entries upon session initialization for user to use/re-use upon login. In some embodiments, the initially preloaded command history cache is specified using unresolved command prototypes, and the intelligent CLI resolves these unresolved command prototypes into actual identifiers of LRs and PEs. These inserted, resolved commands in the command history cache allows the user to quickly identify and reuse commands with actual identities of LRs and PEs for troubleshooting purposes. In some embodiments, the configuration data of the CLI specifies the commands that are to be preloaded into command history cache upon login or initialization.

In some embodiments, the intelligent CLI resolves command prototypes according to CLI configuration and recent user input commands. Some embodiments resolve a command prototype by resolving all its required parameters, including non-identity parameters and identity parameters. Non-identity parameters are resolved by default value or settings in the CLI configuration. Identity parameters are resolved dynamically during runtime by using command resolvers. In some embodiments, when resolving a command prototype, the command resolver follows the dependencies of unresolved commands to ensure all dependent command prototypes are also resolved.

Some embodiments provide a physical endpoint (PE) channel manager that maintains adaptive command timeout timers when the user is troubleshooting the distributed system. The PE channel manager updates the adaptive command timeout timer according to the response time of a heartbeat command. In some embodiments, the physical endpoint channel manager keeps the heartbeat to a physical endpoint active only when user mentions the physical endpoint recently or it is predicted that the user may mention the physical endpoint in the near future. In some embodiments, the physical endpoint channel manager keeps the heartbeat to a physical endpoint active when the user has recently mention the logical resources on the physical endpoint.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIGS. 5a-b and 6a-b illustrate some components of centralized trouble shooting services provided by the centralized troubleshooting tool.

FIG. 7 illustrates an example screen capture of the centralized troubleshooting tool.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide a centralized troubleshooting tool (CTT) that enables user to troubleshoot a distributed virtual network with a single consistent user interface. The distributed virtual network being monitored or debugged by the centralized troubleshooting tool includes different types of logical resources (LRs) that are placed or distributed across different physical endpoints (PEs) of the physical network. In some embodiments, the centralized troubleshooting tool provides SingleSignOn (SSO) function or commands proxy function. These functions in some embodiments allow the user to invoke commands on different physical endpoints in order to collect information about the logical resources running in those PEs. This allows the user to compare and analyze the information from different PEs for a same LR in order to troubleshoot problematic LRs as wells PEs.

The centralized troubleshooting tool in some embodiments provides a centralized troubleshooting service, endpoint adapters, and several different types of user interfaces such as command line interface (CLI) and Graphical User Interface (GUI). The endpoint adapters use a management network for connecting to network PEs such as controllers, edge appliance, and hosts. In some embodiments, the data between endpoint adapters and PEs are transmitted as transparent plain text so that the centralized troubleshooting service of the CTT can use data provided by any existing debugging service provided by the corresponding PE without modification. The centralized troubleshooting tool in turn extracts and reformats the plain text result for presentation/display to the user.

Figure 1:
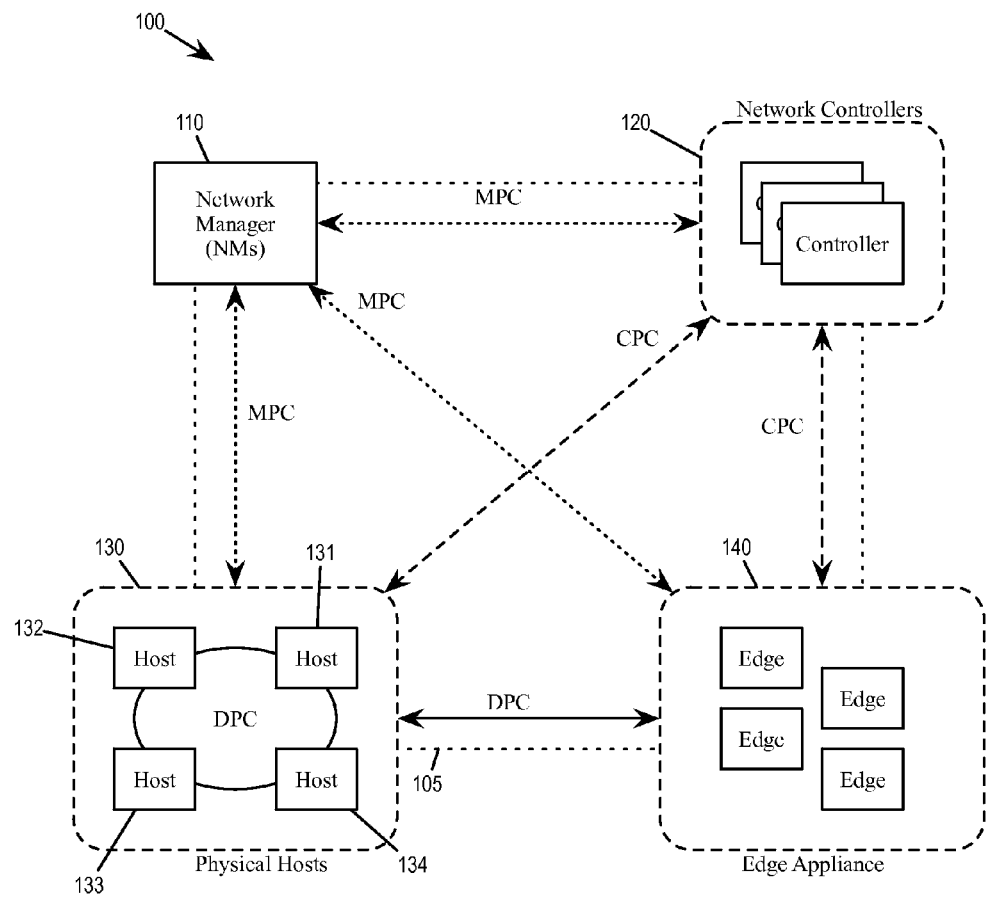
FIG. 1 illustrates a distributed network environment that is built over a physical network having PEs of different types.
Figure 2:
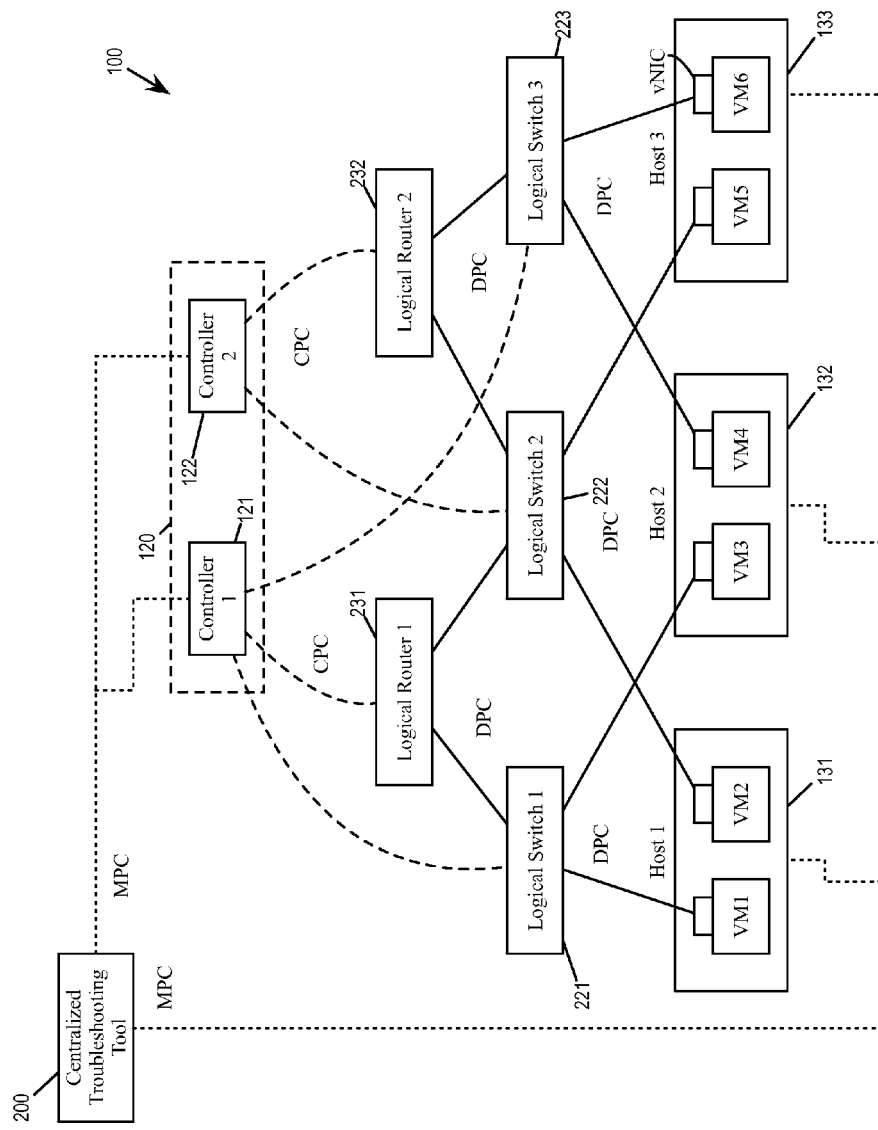
FIG. 2 illustrates a logical view of the distributed virtual network.

For some embodiments, FIGS. 1 and 2 illustrate a distributed virtual network environment 100 that is being debugged/monitored by a centralized troubleshooting tool. The distributed network environment 100 is built over a physical network 105 having physical endpoints (PEs) of different types. As illustrated, the distributed network 100 is implemented over PEs such as a network manager (NM) 110, network controllers (NC) 120, physical hosts (or host machines) 130, and edge appliances 140.

In some embodiments, the distributed virtual network environment 100 is provided by a data center, which provides network and computing resources for one or more tenants. In some embodiments, the distributed network environment 100 provides and operates different logical networks for the data center's various tenants. Each logical network includes various logical resources (LRs) such as logical switches and logical routers. These logical resources are implemented on physical computing and networking resources, i.e., the physical endpoints (PEs). Specifically, some of the computing resources provided to the tenants are in the forms of virtual machines (VMs) that are operated/hosted by the host machines (e.g., 130), and some of the LRs are implemented by the host machines and the edge appliances (e.g., 140).

The network manager 110 in some embodiments provide user interface and control of the resources of the distributed network environment 100. Specifically, the network manager 110 performs operations such as monitoring network activities, provisioning/creating VMs and LRs, among others. In some embodiments, in order to provision the LRs, the network manager 110 generates configuration data for the network controllers 120, the host machines 130, and the edge appliances 140. The host machines 130 use the received configuration data to implement the provisioned LRs, and the network controllers 120 provides real-time control of the provisioned LRs running in the host machines 130 according to its received configuration data from the network manager 110. In some embodiments, the network controllers 120 is a cluster of controllers where each controller control a subset of LRs (e.g., one logical switch).

To support the communication between the PEs over the physical network 105 when operating the various logical networks, some embodiments setup different channels in the distributed network environment 100, including Management Plane Channel (MPC), Control Plane Channel (CPC), and Data Plane Channel (DPC). DPC is the communication channel used by the distributed network environment 100, which transport the "real" network data of logical networks, e.g., computation data generated for tenant applications. As illustrated, DPC is for transporting data among the host machines 130 as well as to and from the edge appliances 140. CPC is the channel for delivering control signals from the network controllers 120 to control the logical network structures (running in host machines 130 and edge appliance 140) in real time. MPC is the channel for delivering configuration and management data to and from the network manager 110, such as data for provisioning VMs, LRs as well as data for debugging and monitoring PEs.

FIG. 2 illustrates a logical view of the distributed virtual network environment 100. The logical view shows the logical relationships among the LRs and the VMs that are implemented over (or placed in) the PEs of the physical network. As illustrated, the distributed virtual network environment 100 is implementing LRs such as logical routers 231 and 232, logical switches 221, 222, and 223. The controllers 121 122 (which are part of the controller cluster 120) controls these LRs. The VMs 211-216 operated by host machines 131-133 use the logical switches 221-223 for L2 packet switching operations and logical routers 231-232 for L3 packet routing operations (through the VMs' virtual network interface controllers, or VNICs). In some embodiments, each tenant of the data center owns a subset of the LRs and VMs. For example, in some embodiments, each logical router serves one tenant-specific logical network.

Some of these LRs have their functionalities distributed across different PEs. For example, in some embodiments, each logical router is a virtual distributed router (VDR) that spans (i.e., operates in) multiple host machines (e.g. 131-133), each host machine running a local physical instance (referred to as managed physical routing element or MPRE) of the VDR. Likewise, in some embodiments, each logical switch is a distributed virtual switch (DVS) that spans multiple host machines, each host machine running a local instance (referred to as managed physical switching element or MPSE) of the DVS. MPRE and MPSE will be further described below in Section IV.

FIG. 2 also illustrates a centralized troubleshooting tool (CTT) 200 that is used by the user to monitor and debug the distributed virtual network environment 100. The troubleshooting tool 200 provides a user interface for debugging and monitoring the various LRs and VMs of the distributed virtual network environment 100. It is running in the network manager 110 and uses the MPC to monitor (i.e., receive monitored data from) the controllers 121-122 and the host machines 131-133. The tool 200 allow the user to invoke commands on different PEs in order to collect information about the LRs running in those PEs. This allows the user to compare and analyze the information from different PEs for a same LR (or a same set of LRs).

In some embodiments, the troubleshooting tool allows the user to view debugging information from different PEs all a same view. In some embodiments, the tool 200 allows user to view the debugging information regarding a particular LR from all of the PEs implementing the particular LR in a same view. For example, the operations of the logical switch 221 spans the host 131, 132 and the controller 121 (i.e., the logical switch is operating in host machines 131-132 and is controlled by the controller 121). The tool 200 facilitates the debugging of the logical switch 221 by having information regarding the logical switch 221 from the host machines 131, the host machine 132, and the controller 121 in a same view.

Several more detailed embodiments of the invention are described below. Section I discusses the centralized troubleshooting tool in greater detail. Section II describes an intelligent command line interface (CLI) for the centralized troubleshooting tool. Section III describes adaptive timers for managing the connections with various physical endpoints. Section IV describes a computing device that operates virtualization software and serves as a host machine. Finally, section V describes an electronic system with which some embodiments of the invention are implemented.

I. Centralized Trouble Shooting Tool

Figure 3:
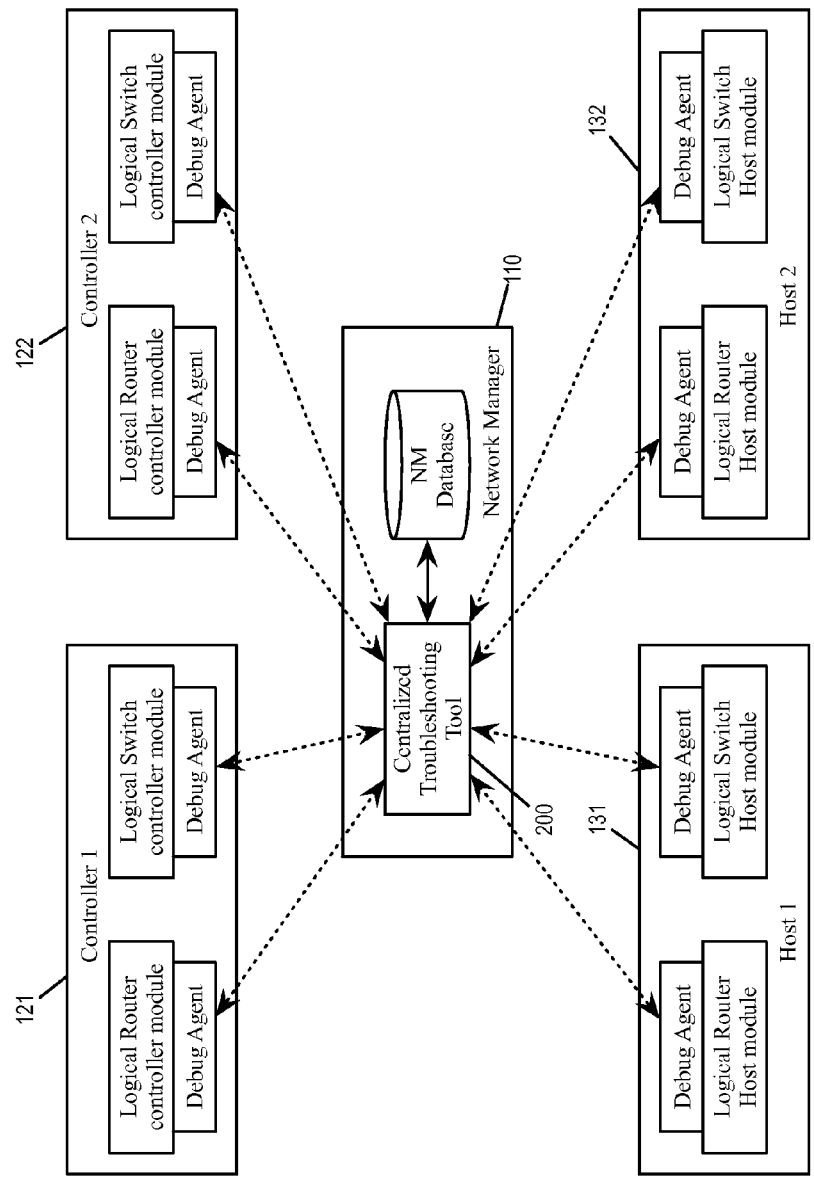
FIG. 3 illustrates a centralized troubleshooting tool (CTT) that is monitoring the distributed virtual network.

FIG. 3 illustrates the centralized troubleshooting tool (CTT) 200 that is monitoring the distributed virtual network environment 100 in greater detail. The CTT 200 is running in the network manager 110 and is in communication with all PEs of the distributed virtual network environment 100.

As illustrated, the CTT 200 is in communication with PEs such as the controllers 121-122 and the host machines 131-132. Each of these PEs is running a local instances of the various LRs (e.g., logical router controller module in the controller 121, the logical switch host module in the host 132, etc.) Each of these PEs also has debugging agents that provide debugging services to the outside world. In some embodiments, the debugging services of a PE is provided to allow the user to monitor/debug/troubleshoot the operations of the PE. For a PE that is operating VMs and LRs, the debugging services of the PE allows debugging operations with regards to those VMs and/or the LRs. In some embodiments, such a PE is running a hypervisor (virtualization software) for hosting the VMs and the LRs, and the debugging agent is a software module within the hypervisor.

The CTT 200 is in communication with the various debugging services running in the various PEs in order to monitor/debug/troubleshoot the PEs. Such communications exposes debugging services available in these PEs to the user. In some embodiments, the CTT 200 presents the data provided by such communications (from the debugging agents of the PEs) in a same view through a user interface component that utilize either graphical user interface (GUI) and/or command line interface (CLI).

Figure 4:
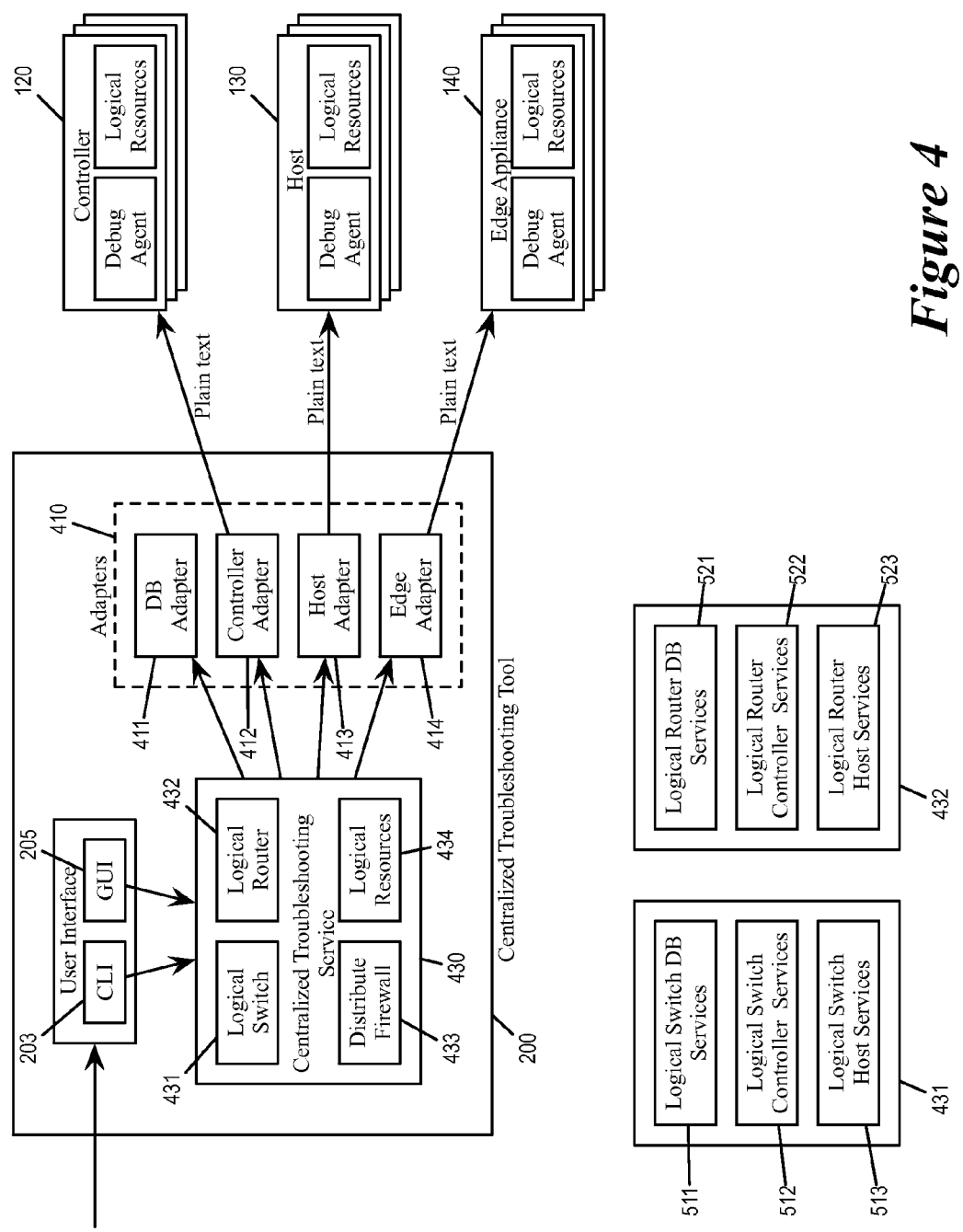
FIG. 4 illustrates various components of the centralized troubleshooting tool.

FIG. 4 illustrates the various components of the centralized troubleshooting tool 200 for some embodiments. As illustrated, the CTT 200 includes a centralized troubleshooting services module 430, PE adapters 410, and a user interface module 420. The user interface module 420 have one or more user interface client for user to access the troubleshooting services, such as a CLI client 203 and/or a GUI client 205.

In some embodiments, a CTT includes different PE adaptors that correspond to different types of PEs. Specifically, the PE adapters 410 include a DB adapter 411, a controller adapter 412, a host adapter 413, and an edge adapter 414. The controller adapter 412 is for communicating with the controllers 120 (i.e., 121-123), the host adapter 413 is for communicating with the host controllers 130 (i.e., 131-133), and the edge adaptor 414 is for communicating with the edge appliances 140. In some embodiments, the types of adaptors needed are defined differently than the example shown in FIG. 4. For example, in some embodiments, CTT provide different PE adaptors for different corresponding communication protocols. In some embodiments, CTT provides different PE adaptors for different manufactures.

In some embodiments, a adaptor of a PE is responsible for handling the communication with the PE. An adaptor does so by providing an interface/translation between the internal signaling of the CTT and the signaling of the PE. In some embodiments, each of the PE adapters 410 may be implemented with Telnet/SSH Channel, Message Q, or HTTP channels, depending what is the existing MPC between the NM and the PEs. In some embodiments, the message format between the PE adapters 410 and their corresponding PEs is plain text so that existing debugging modules/agents/services in any PE can be preserved and need not change. In some embodiments, such signaling with the PE includes the exchange of necessary login information on behalf of the user of the CTT.

The centralized troubleshooting services module 430 includes several centralized troubleshooting services for different LRs in the distributed virtual network environment 100, including a logical switch troubleshooting service 431, a logical router troubleshooting service 432, and a distributed firewall troubleshooting service 433, and a logical resources trouble shooting service 434.

FIG. 4 also illustrates the various components of the logical switch troubleshooting service 431 and the various components of the logical router troubleshooting service 432. In some embodiments, each component corresponds to a set of services that a user can invoke when performing trouble shooting. As illustrated, the logical switch troubleshooting service 431 provides a set of logical switch DB (database) services 511, a set of logical switch controller services 512, and a set of logical switch host services 513. The logical router troubleshooting service 432 provides a set of logical router DB services 521, a set of logical router controller services 522, and a set of logical router host services 523.

FIGS. 5a-b illustrate some components of the logical switch troubleshooting service 431. Specifically, the figures illustrate components of logical switch DB services 511, the logical switch controller services 512, and the logical switch host services 513. FIGS. 6a-b illustrate some components of the logical router troubleshooting service 432. Specifically, the figure illustrates components of the logical router DB services 521, the logical router controller services 522, and the logical router host services 523. Each of these components represents a set of operations that the centralized trouble service can perform in response to user command from the user interface (either the CLI 203 or the GUI 205).

FIG. 7 illustrates an example screen capture 700 of the CTT. The screen capture 700 shows example commands 701-705 that show troubleshooting information about a LR from different PEs in one view.

The command 701 ("show logical-switch controller 10.111.10.132 vni 5000 mac") shows MAC addresses related to logical switch having VNI 5000 from controller at IP address 10.111.10.132. The command 702 ("show logical-switch host 10.160.65.238 vni 5000 mac") shows MAC addresses related to logical switch having VNI 5000 from host at IP 10.160.65.238. With these two commands (701 and 702) the user can compare the MAC information of the logical switch VNI 5000 from the controller 10.111.10.132 and the host 10.160.65.238.

The CTT can also be used to match the PE identities automatically. The commands 703-704 retrieve information from the same PE (a controller). Specifically, the command 703 ("show logical-switch controller 10.111.10.132 vni 5000 mac") uses controller IP address 10.111.10.132 while the command 704 ("show logical-switch controller controller-1 vni 5000 mac") uses or controller ID "controller-1".

In a NSX distributed virtual network, a logical switch has a master controller and a logical router has a master controller. When the logical resource has a master physical endpoint, the centralized troubleshooting tool can be used to find the master physical endpoint automatically. The commands 705 ("show logical-switch controller master vni 5000 mac") retrieve information for a logical switch from its master controller without the need or user to specify a controller. The command 706 ("show logical-router controller master dlr edge-2 brief") retrieves information for a logical router from its master controller without the need or user to specify a controller.

In some embodiments, each command (or troubleshooting service request) is processed and understood by the CTT 200, and the CTT 200 processes the command into communications with the debugging modules of the various PEs (through the PE adaptors 410). The CTT 200 then gathers the response from the various PEs and formats the gathered response for display according to the processed command service request. Some of these services/commands are for a specific LR (or a set of LRs) that are operating in some of the PEs, so the CTT would communicate with the debugging service of those PEs in order to access (the local instance of) the LRs operating in those PEs. The information gathered from the communications with the PEs is then presented in one view for the specified LR. In some embodiments, the process presents the information gathered for one debugging inquiry/troubleshooting command in one view.

Figure 8:
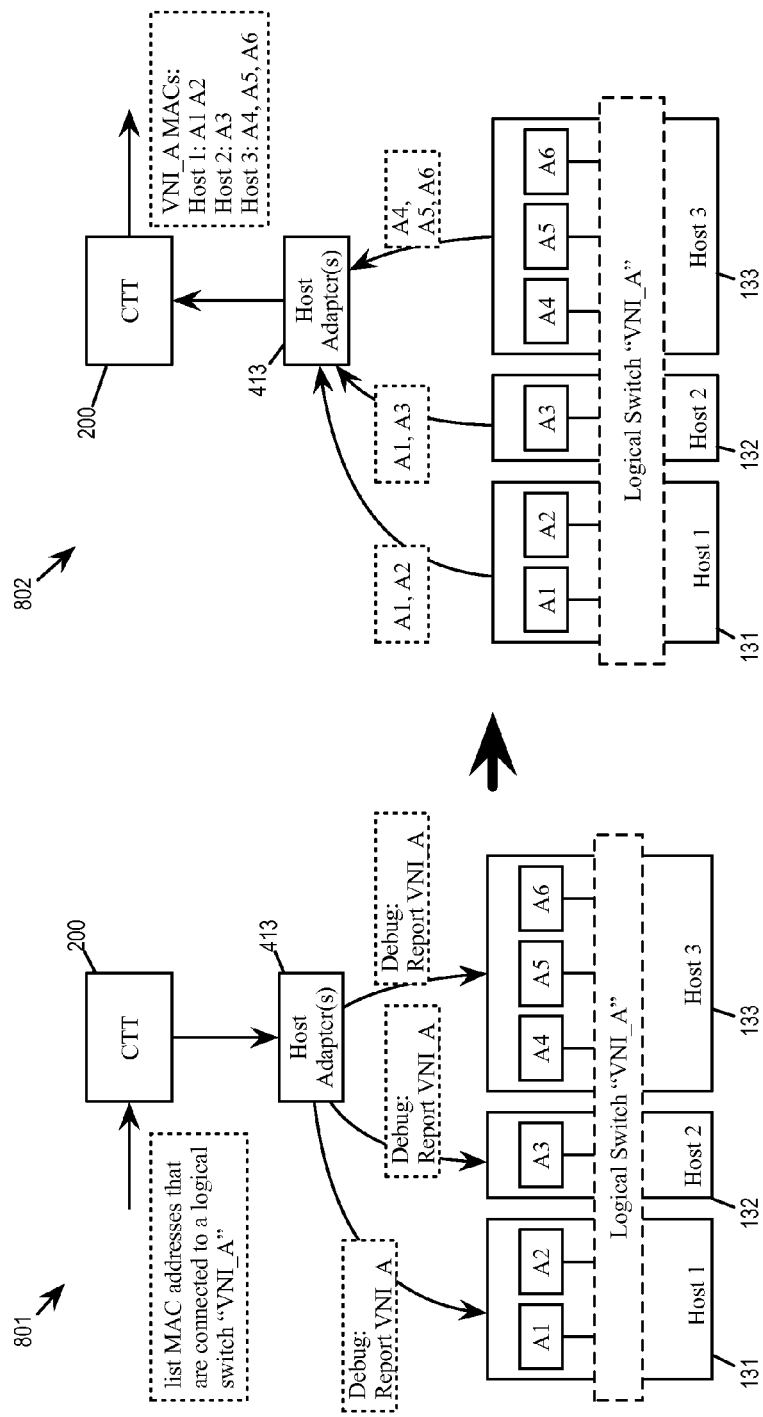
FIG. 8 illustrates an example command that is interpreted by the centralized troubleshooting tool.

FIG. 8 illustrates the interpretation of an example command by the CTT 200. The CTT in turn gathers the desired debugging information from various PEs and places the gathered information in one view for a specified LR. The figure illustrates the actions undertaken by the CTT 200 in response to an example command "list MAC addresses that are connected to a logical switch" for a logical switch with identifier "VNI_A".

As illustrated, the logical switch VNI_A spans (i.e., operates in) host machines 131-133. At the host machine 131, the logical switch VNI_A is connected to VMs with MAC addresses "A1" and "A2". At the host machine 132, the logical switch VNI_A is connected to a VM with MAC address "A3". At the host machine 133, the logical switch VNI_A is connected to VMs with MAC addresses "A4", "A5", and "A6".

The figure illustrates the action of the CTT 200 in response to the example command 810 in two stages 801 and 802. At the first stage 801, the CTT 200 receives the command "list MAC addresses that are connected to a logical switch VNI_A". The CTT then communicates with host machines 301-303 through the host adaptors 413. These PE adaptors (in this case the host adaptors 413) send debugging commands to each PE (in this case the host machines 131-133) querying the MAC addresses of the VMs that are connected to the logical switch "VNI_A". The communication with each PE is performed according to the existing management plane channel between the network manager (i.e., 110) and the PE, which may be implemented with Telnet/SSH Channel, Message Q, or HTTP channel. In some embodiments, the communication is also specific to the format required by the PE.

At the second stage 802, each of the host machines 131-133 sends its reply to the host adaptors 413 and reach the CTT 200. Specifically, the host machine 131 replies with MAC addresses "A1" and "A2", the host machine 132 replies MAC address "A3", and the host machine 133 replies with MAC addresses "A4", "A5", and "A6". The CTT 200 in turn compiles the result into one view for the logical switch "VNI_A" in either CLI or GUI form.

The example of FIG. 8 illustrates a debugging command that queries LR information from PEs that are host machines. The CTT 200 therefore uses host adaptors to obtain the queried information about the LR from host machines. Though not illustrated, one of ordinary skill would understand that debugging commands that queries LR information from other types of PEs (controllers and/or edge appliances) would cause the CTT to use other types of adaptors to obtain the queried information about the LR from the PEs of other types.

In some embodiments, presenting the information gathered from different PEs (hosts and/or controllers) "in one view" means to present the information in one user viewable arrangement. For example, some embodiments present the information gathered from different PEs in one table. Some embodiments present the information gathered from different PEs in one GUI item (such as one scrollable window). Some embodiments present the information gathered from different PEs in one CLI text line. Some embodiments place information from different PEs regarding a same LR in a same viewable arrangement.

In some embodiments, information from different PEs are gathered in response to one/a same troubleshooting command/debugging inquiry from the user. In some embodiments, one such debugging inquiry/troubleshooting command invokes multiple services to different PEs (such as those presented in FIGS. 5a-b and 6a-b). The CTT gathers information relevant to the one user debugging inquiry from all of the different PEs by all of the invoked services and presents the gathered information in one view. In some of these embodiments, presenting the information gathered from different PEs "in one view" means to present the gathered information as one response to one user inquiry without any intervening input from user interface (CLI or GUI).

Figure 9:
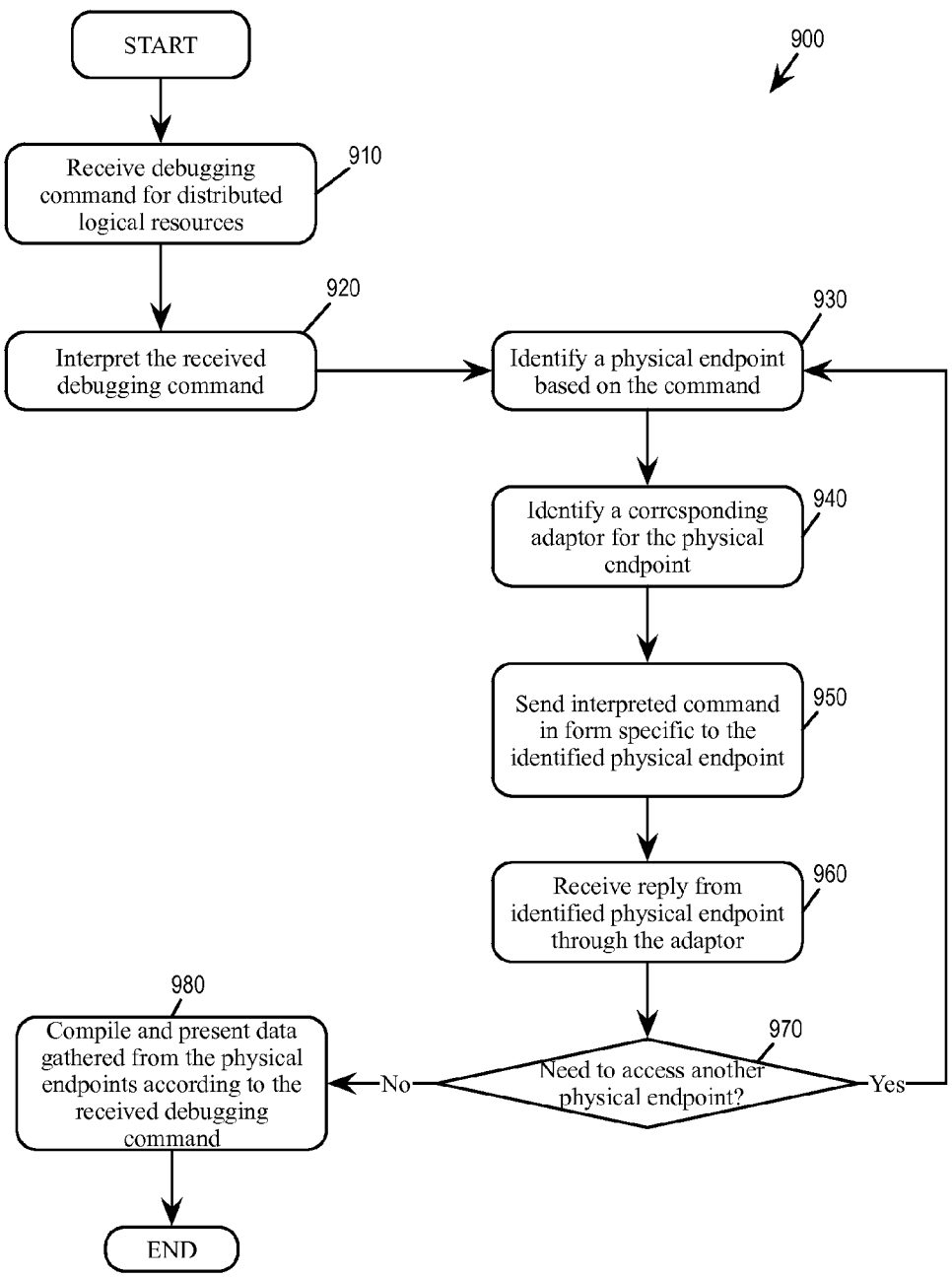
FIG. 9 conceptually illustrates a process for performing centralized debugging in a distributed virtual networking environment.

For some embodiments, FIG. 9 conceptually illustrates a process 900 for performing centralized debugging in a distributed virtual networking environment. In some embodiments, a network manager (e.g., 110) performs the process 900 when it operates a centralized troubleshooting tool (e.g., CTT 200).

The process 900 starts when it receives (at 910) a debugging command for distributed logical resources. The received commands in some embodiments require access of LRs (such as logical routers and logical switches) that are distributed across multiple different PEs (such as host machines and controllers) in a distributed virtual network environment (e.g., 100). Some embodiments receive this command through a CLI or a GUI of the centralized troubleshooting tool. FIGS. 5a-b and 6a-b illustrate some of the services that the centralized troubleshooting tool can perform in order to respond to (i.e., to implement) the received debugging command.

The process then interprets (at 920) the received debugging command. The network manager in some embodiments interprets the received debugging command/troubleshooting inquiry by using one or more centralized troubleshooting services such as those presented in FIGS. 5a-b and 6a-b. In some embodiments, the operations 930 through 960 are performed with regards to the interpreted command, i.e., with regard to the invoked centralized troubleshooting services.

The process then identifies (at 930) a physical endpoint (PE) based on the interpreted command (i.e., based on the identified centralized trouble shooting services for the received debugging command). Such a PE can be a host machine, a controller, an edge appliance, or any other types of devices that serve as an endpoint in the distributed virtual network environment. The process then identifies (at 940) a corresponding PE adaptor for the identified PE. As mentioned, in some embodiments, different devices serving as PEs may employ different communication protocols or data formats. The process therefore has to identify the correct corresponding PE adaptor in order to communicate properly with the identified PE.

The process then sends (at 950) the interpreted command (e.g., the identified centralized troubleshooting services for the debugging command) to the identified PE in a form understood by the identified PE. In some embodiments, based on the interpretation of the received command and the identified troubleshooting services, the process creates sub-command specific to the identified PE, and the corresponding PE adaptor then translate the sub-command into a form understood by the PE. The translated command is then transmitted to the identified PE to execute the debugging command. The process then receives (at 960) a reply from the identified PE through the PE's adaptor.

The process then determines (at 970) whether the interpreted debugging command requires the process to access another PE. A troubleshooting command may inquire about a LR that spans multiple PEs. A troubleshooting command my also inquire about a PE that is operating multiple LRs. If the debugging command requires access of another PE, the process returns to 930. Otherwise the process proceeds to 980.

At 980, the process compiles and presents the data gathered from the PEs in accordance with the received debugging command. For example, if the command inquires information regarding a logical router that spans multiple host machines, the process would process the data from those host machines and to present the data relevant to the inquiry about the logical router in a coherent format (e.g., in one GUI item or in a same table in CLI).

II. Intelligent CLI

As mentioned, in some embodiments, the CTT includes a CLI user interface. For advanced users, CLI is often preferred because they often provide a more concise and powerful means to control a program or operating system. One of the most powerful features of CLI is that it provides command history that allows the user to easily identify and reuse a previous command, or to modify a previous command into a new command. However, when using CLI to debug LRs in a distributed networking environment, command history can be difficult to use. This is because LRs are placed across different types PEs. This is also because the identities of LRs and PEs are variables that can change dynamically. Some of the specific problems a user may encounter when using CLI in a distributed networking environment may include: (1) having no command history cache to use upon login; (2) having to use different commands for the same LR on different PEs; (3) having to use PE and LR identifiers that are meaningless and hard to remember.

Some embodiments provide an intelligent CLI that facilitates the troubleshooting of a distributed network by generating and inserting entries into the command history cache. These generated entries were never entered by the user but were created by the CLI and inserted into the command history cache for the user to use. In some embodiments, the CLI allows users to enter commands by using command prototypes that are easier to comprehend for human operators. The intelligent CLI in turn resolves the command prototypes into commands with actual identifiers of LRs and PEs. These resolved commands (with the actual identifiers of LRs and PEs) are inserted into the command history cache for use/re-use by the user. In some embodiments, the intelligent CLI preload the command history cache with a set of predetermined entries upon session initialization for user to use/re-use upon login. In some embodiments, the initially preloaded command history cache is specified by unresolved command prototypes, and the intelligent CLI resolves those preloaded command prototypes into actual identifiers of LRs and PEs. These inserted, resolved commands in the command history cache allows the user to quickly identify and reuse commands with actual identities of LRs and PEs for trouble shooting purposes.

In some embodiments, the intelligent CLI resolves command prototypes and preloads commands into command history cache according to CLI configuration and recent user input commands. Some embodiments resolve a command prototype by resolving all its required parameters, including non-identity parameters and identity parameters. Non-identity parameters are resolved by default values or settings in the CLI configuration. Identity parameters are resolved dynamically during runtime by using command resolvers. In some embodiments, when resolving a command prototype, the command resolver follows the dependencies of unresolved commands to ensure all dependent command prototypes are also resolved.

Figure 10:
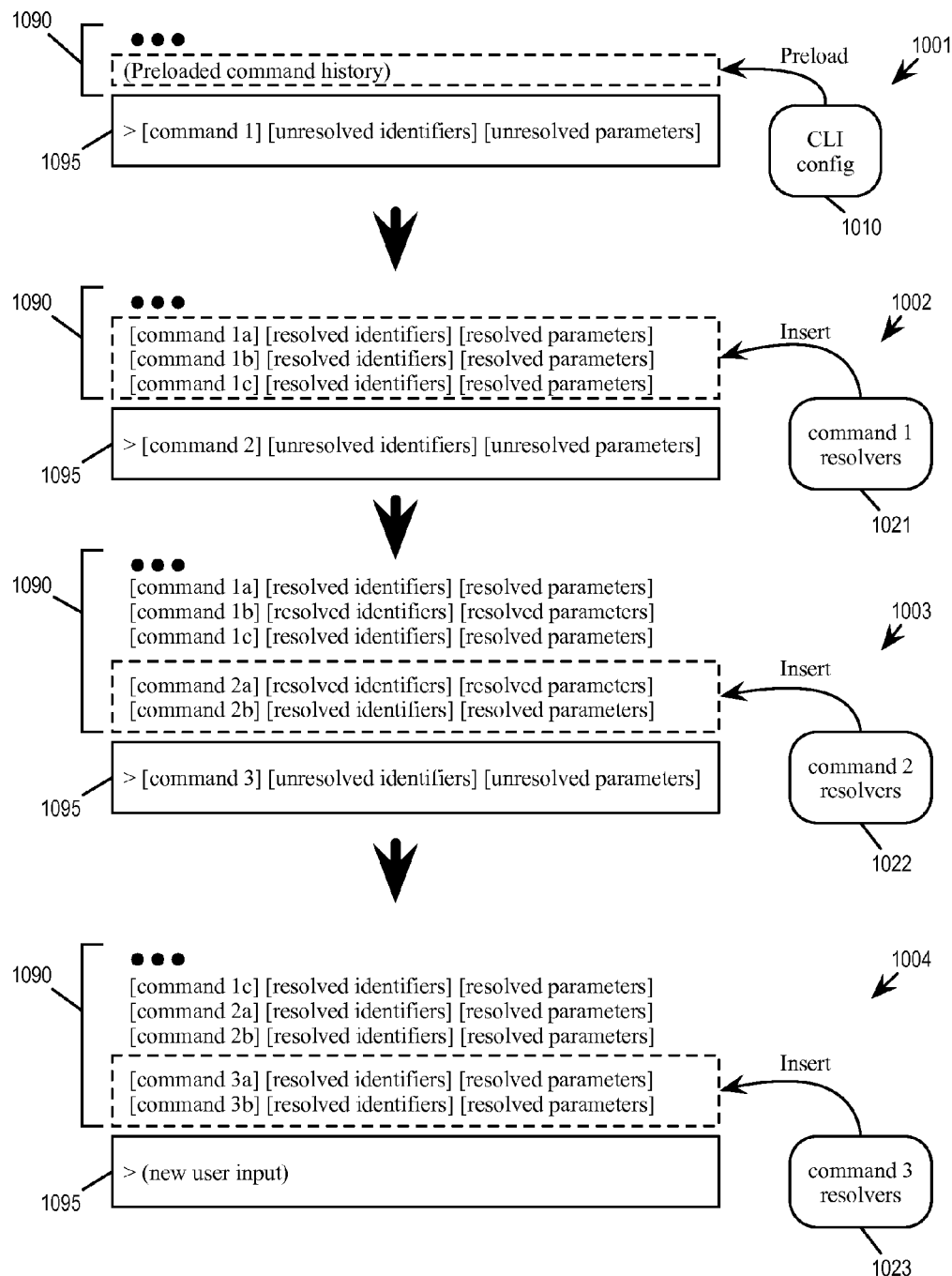
FIG. 10 illustrates the operations of an intelligent CLI that automatically generates and inserts commands into its command history cache.

FIG. 10 illustrates the operations of an intelligent CLI that automatically generates and inserts commands into its command history cache 1090. Upon initialization of the CLI (e.g., user login), the intelligent CLI preloads the command history cache 1090 with a set of command prototypes that are specified by CLI configuration 1010. Subsequent commands entered by the user through the CLI command line 1095 are also entered into the command history cache. Some of these commands (entered by the user or preloaded by the CLI configuration) are command prototypes having unresolved parameters or identifiers. The intelligent CLI would resolve each unresolved command prototypes into one or more resolved commands/parameters/identifiers and insert the resolved commands/parameters/identifiers into the command history cache. FIG. 10 illustrates four such examples in four sequential stages 1001-1004.

The first stage 1001 shows the preload of commands into the command history cache. These commands are from a CLI configuration 1010, which in some embodiments specifies a set of commands that are to be preloaded into the command history cache for the user upon login or initialization. The stage 1001 also show the user entering a first command "command 1" through command line 1095, which has a set of unresolved identifiers and parameters.

The second stage 1002 shows the resolution of "command 1" into resolved identifiers and parameters. The intelligent CLI identifies a set of resolvers for resolving command 1 ("command 1 resolvers" 1021), which resolves "command 1" and its corresponding identifiers and parameters into "command 1a", "command 1b", and "command 1c", each having resolved identifiers and parameters. These resolved commands are then inserted into the command history cache 1090. In the meantime, the user has entered a second command "command 2" through the command line 1095, which also has a set of unresolved identifiers and parameters.

The third stage 1003 show the user entering a subsequent command "command 3" at the CLI as well as a resolver 1022 resolving "command 2" and entering the corresponding resolved commands "command 2a" and "command 2b" into the command history cache 1090. The fourth stage 1004 shows a resolver 1023 resolving "command 3" and entering the corresponding resolved commands "command 3a" and "command 3b" into the command history cache 1090.

Figure 11:
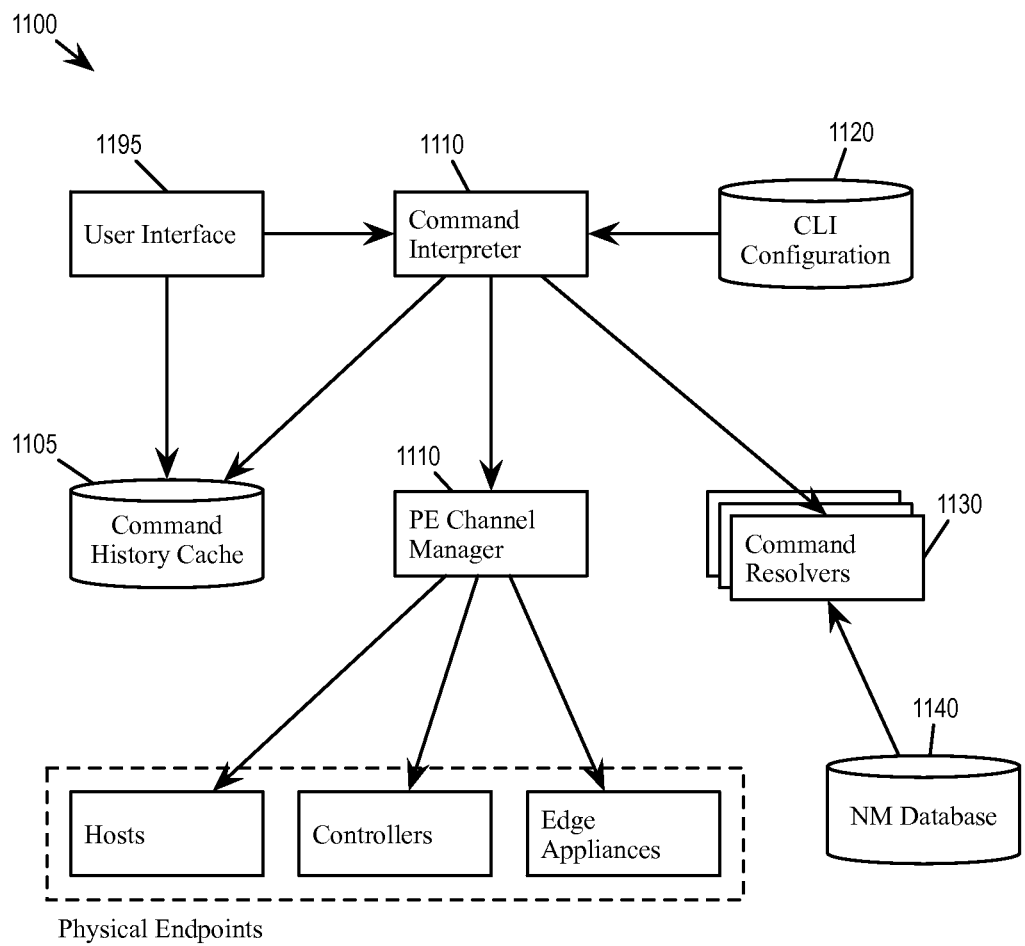
FIG. 11 illustrates various components of an intelligent CLI.

FIG. 11 illustrates various components of an intelligent CLI 1100 for some embodiments of the invention. The CLI 1100 has a command interpreter that interprets the received command. The CLI also has a command history cache for saving past CLI user interactions for future reuse by the user. Based on the configuration of the CLI and command history of current user session, the command interpreter can insert some command prototypes into the command history cache, which means, though some commands are not really executed by the user recently, they appear to the user as if they have been executed and user can simply populate his/her CLI and change some parameter values to re-invoke the commands.

As illustrated, the intelligent CLI 1100 includes a CLI interpreter module 1110, a command history cache 1105, a command line user input 1195, a command resolvers 1130, a CLI configuration 1120, a network manager database 1140, and a PE channel manager 1160.

The CLI Interpreter module 1110 loads static configuration from the CLI configuration 1120, interprets user inputs 1195, evaluate outputs of the commands, directs command resolvers 1130 to resolve unresolved command prototypes and add resolved commands to command history cache 1105. The CLI Configuration module 1120 can be used to configure different kinds of command resolvers, static command prototypes and dynamic command prototypes.

The command resolver modules 1130 are used to resolve command prototype and command identity parameters according to different information sources, such as the NM database 1140 as well as command results from other resolved command prototypes. There are multiple command resolver modules that are used to resolve different types command, LRs and PEs, and the CLI 1100 in some embodiments select a corresponding resolver module for resolving each command.

The PE Channel Manager module 1160 manages the connection between the NM and remote PEs to provide a responsive command channel. The PE Channel Manager can be configured to use a heartbeat command to test the channel between the NM and the remote PEs (including hosts, controllers, edge appliance). In some embodiments, for each channel, the PE channel manager 1160 activates an adaptive heartbeat between the NM and a PE. Operations of a PE channel manager will be further described in Section III below.

In some embodiments, a command prototype can only be inserted into the command history cache when the command prototype is resolved. In some embodiments, a command is resolved if and only if all of its required parameters are resolved. A parameter is naturally resolved if it is input by the user. But when user does not input the required parameter, the parameter is resolved based on whether it is a non-identify parameter or an identity parameter.

A non-identity parameter is a parameter that is the same across different LRs, parameters such as MTU size, QoS settings, etc. They are resolved either according to the CLI configuration (e.g., 1120) or just default value of the parameter. On the other hand, an identity parameter is a parameter that is unique for each PE or LR (so different for different PEs or LRs), parameters such as ID, name, IP address, MAC address, etc. They are resolved by using command prototype resolvers (e.g., 1130) rather than according to CLI configuration, which resolves the identities according to runtime data as these identity parameters cannot have a default value valid for any resources.

In some embodiments, command prototype resolvers are extensible, pluggable components that can be loaded at runtime. The following are some example command prototype resolvers:

| Resolver | Function |
| --- | --- |
| Logical Switch Sharding Resolver | Find the master controller for the specific logical switch |
| Logical Router Sharding Resolver | Find the master controller for the specific logical router |
| Controller Identity Resolver | Match the controller ID and controller IP address |

| Resolver | Function |
| --- | --- |
| Host Identity Resolver | Match the host ID, host name, and host IP address |
| Edge Appliance Resolver | Match the edge ID, edge appliance host name, and edge appliance IP address |
| Logical Switch Identity Resolver | Match the logical switch name, logical switch VNI, logical switch UUID |
| Logical Router Identity Resolver | Match the logical router id, logical router id on host, decimal logical router id and hexadecimal logical router id in controller |
| Logical Port Identity Resolver | Match the logical port name, logical port ID |

Figure 12:
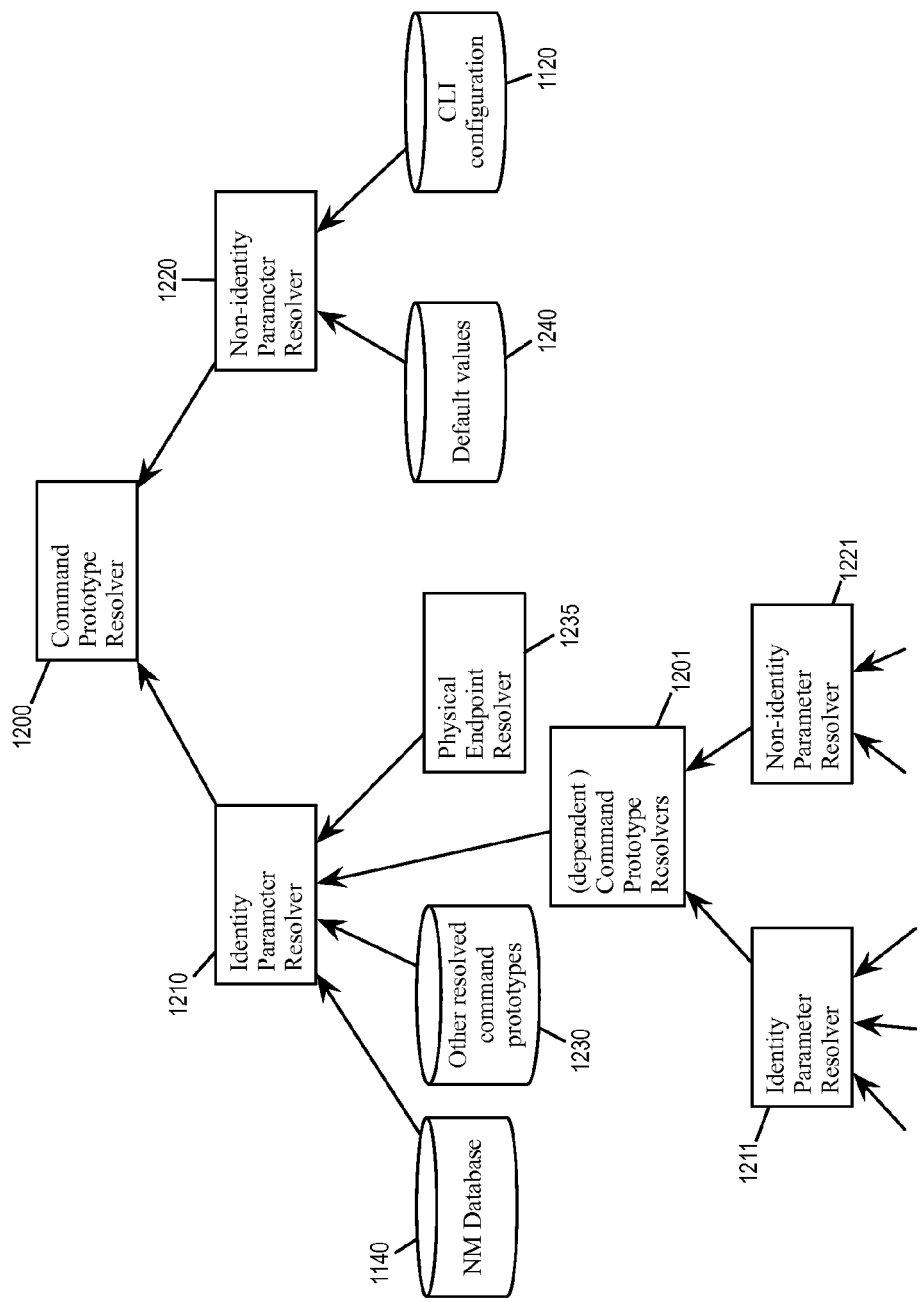
FIG. 12 conceptually illustrates the data flow for resolving a command prototype by command prototype resolver.

FIG. 12 conceptually illustrates the data flow for resolving a command prototype by command prototype resolver. As illustrated, a command prototype resolver 1200 uses an identity parameter resolver 1210 and a non-identity resolver 1220 to resolve its identity parameters and non-identity parameters, respectively. The non-identity resolver 1220 uses default values 1240 and CLI configurations 1120 to resolve the non-identity parameters. The identity resolver 1210 uses NM data 1140, other resolved command prototypes 1230, and a PE resolver 1235 to resolve the identity parameter. The identity resolver 1210 may also (recursively) call on another command prototype resolver 1201, which in turn uses its own identity parameter resolver 1211 and a non-identity resolver 1221, so on and so forth.

In some embodiments, when invoking commands for troubleshooting through the intelligent CLI, the user and the system perform the following operations:

1) User goes through the command history cache and retrieves a command prototype. If user identifies one in the command history cache that is similar to the command he/she wants to invoke, the user can change those arguments to the target he/she wants to use.

2) User invokes the command and a command interpreter of the CLI interprets the command. During the interpreting, the interpreter will check whether all required parameters are resolved or not.

3) If required parameters are resolved, the command is send to the target PE via the PE channel manager to be executed.

4) If required parameters are not resolved, the interpreter would identify and load the correct command resolver according specifications in the CLI configuration.

5) Once the correct command resolver is loaded, the interpreter calls the command resolver to resolve the parameters. When resolving a command parameter, the command parameter may call the PE manager to find the correct physical endpoints or call network manager database to find any target source identities.

6) When all the required parameters are resolved, the command is sent to the target PE via the PE Channel Manager to be executed.

7) The command is executed on the target PE and the result is returned to the interpreter.

8) The interpreter adds the resolved command to the command history cache and returns the result to the user interface.

During the process of resolving a command prototype, the command interpreter may encounter commands that depend on other command prototypes to be resolved first. In such scenarios, the interpreter in some embodiments triggers a sub-process to resolve the depended command prototypes until all depended command prototypes are resolved.

In addition to inserting generated commands into the command history cache that are based on resolved user invoked commands, the intelligent CLI also preloads predetermined commands into the command history cache during session initialization of the CLI according to the following:

1) User logs in to start using the CLI, and the Command Interpreter read the CLI configuration related to the user controlling the session (i.e., the user who just logged in).

2) The CLI preloads the command history cache with command prototypes that are specified by the user's CLI configuration.

3) Command Interpreter resolves the preloaded command prototypes based on the CLI configuration. The resolved command prototypes are inserted into the command history cache.

Figure 13:
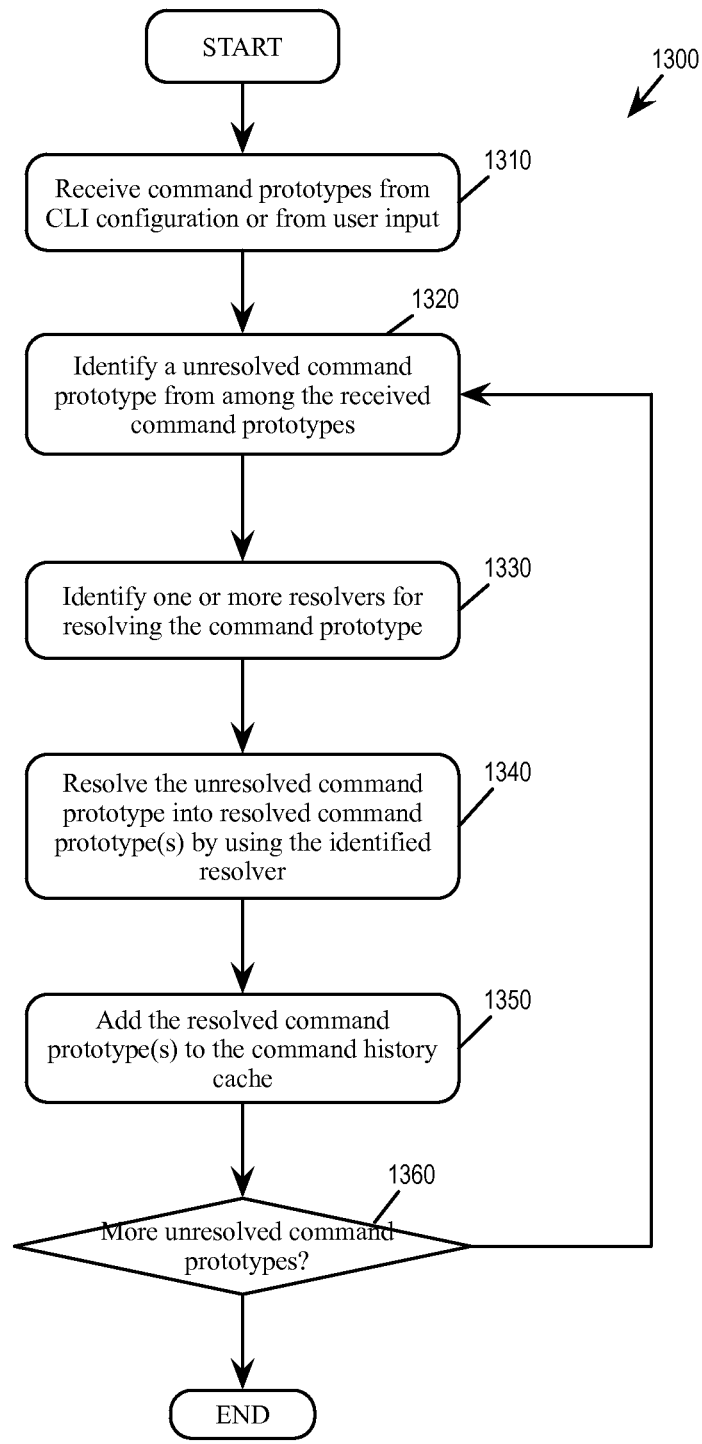
FIG. 13 conceptually illustrates a process for resolving command prototypes and for adding the resolved command prototypes to the command history cache.

FIG. 13 conceptually illustrates a process 1300 for resolving command prototypes and for adding the resolved command prototypes to the command history cache. The process 1300 starts when it receives (at 1310) a set of command prototypes from the CLI configuration or from the user input. Such command prototypes can be from command line user interface (i.e., typed in by the user), or preloaded from the CLI configuration. Some of these command prototypes can be dynamic command prototypes whose underlying LR/PE identities can be changed dynamically in real-time. Some of these can be static command prototypes that are predetermined and do not change.

Next, the process identifies (at 1320) an unresolved command prototype from among the received command prototypes. The process then identifies (1330) one or more corresponding resolvers for the identified command prototype. In some embodiments, the process would identify a template from the CLI configuration for the identified command prototype, and then uses the template to identify the corresponding command prototype resolvers. As mentioned above, some embodiments provide a multitude of command prototype resolvers, such as logical switch sharding resolver, logical router sharding resolver, controller identity resolver, host identity resolver, etc. The process selects a corresponding command prototype resolver for the identified command prototype. In some embodiments, the process initially selects a generic command prototype resolver, and the generic resolver in turn identifies one or more resolvers for resolving the various (identity and non-identity) parameters. The process then resolves (at 1340) the identified command prototype by using the identified command resolver(s) and inserts (at 1350) the resolved command prototypes into the command history cache.

The process then determines (at 1360) whether there are more unresolved command prototypes to be resolved. If so, the process returns to 1320 to identify and resolve the next command prototype. Otherwise the process 1300 ends.

Figure 14:
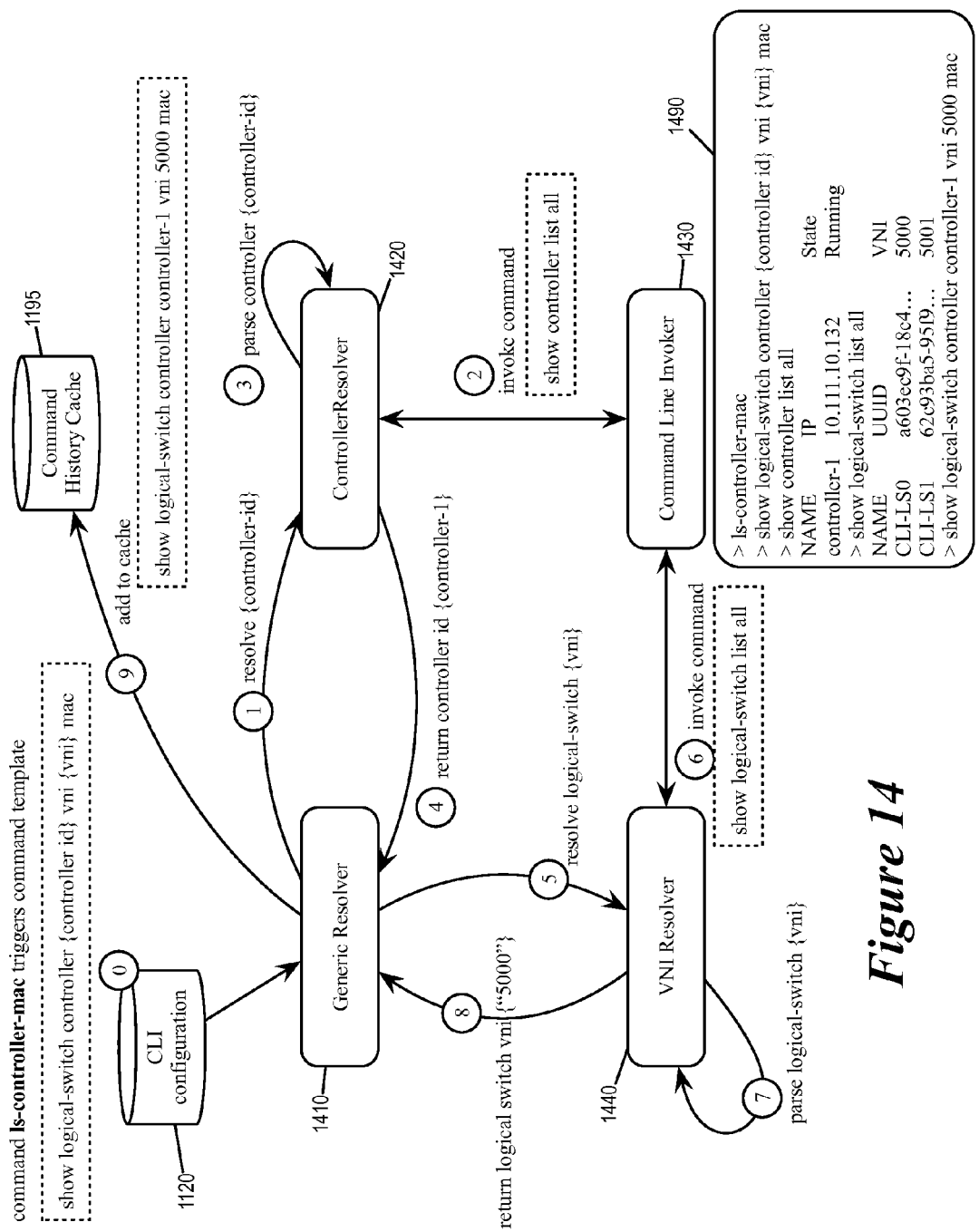
FIG. 14 illustrates the intelligent CLI resolving an example command prototype.

FIG. 14 illustrates the intelligent CLI resolving an example command prototype "ls-control-mac" using command resolvers and then add the resolved command to the command history cache. In some embodiments, the resolution of the command prototype is specified by the CLI configuration. In this example, according to the CLI configuration, the command "ls-controller-mac" is to be resolved according to a template command "show logical-switch controller {controller id} vni {vni} mac". Furthermore, the CLI configuration specifies that the command "ls-controller-mac" depends on commands "controller-list-all" and "ls-list-all" being resolved first. Calling command controller-list-all will report one controller "controller-1", and calling the command "show logical-switch list all" will report one logical switch with VNI "5000". Consequently, the intelligent CLI inserts a command "show logical-switch controller controller-1 vni 5000 mac" into the command history cache as the result of resolving the command prototype "ls-controller-mac".

The figure illustrates the resolution of the command prototype "ls-control-mac" in ten operations labeled "0" through "9". The figure also illustrates a screenshot 1490 of the CLI that includes commands invoked by the user, commands automatically invoked by the resolver (through a command invoker), and their corresponding responses by the PEs through the CLI.

At the operation labeled '0', the CLI identifies a resolution template for the command prototype "ls-control-mac" from the CLI configuration 1120, namely the template "show logical-switch controller {controller id} vni {vni} mac". In order to resolve the command prototype based on the identified template, the CLI uses a generic resolver 1410 to resolve the template "show logical-switch controller {controller id} vni {vni} mac".

The generic resolver 1410 calls (at operation '1') a controller resolver 1420 to resolve the identity parameter {controller id} in the template. The controller resolver 1420 in turn calls (at operation '2') a command line invoker 1430 to invoke the command "show controller list all". The invocation of the command "show controller list all" reports that there is one controller whose ID is "controller-1" and whose IP is "10.111.10.132". The controller resolver 1420 then parses (at operation '3') out the controller ID "controller-1" and returns (at operation '4') this controller ID back to the generic resolver 1410.

The generic resolver 1410 then calls (at operation '5') a VNI resolver 1440 to resolve the identity parameter {vni} in the template. The VNI resolver 1440 in turn calls (at operation '6') the command line invoker 1430 to invoke the command "show logical-switch list all". The invocation of the command "show logical-switch list all" reports that there are two logical-switches whose VNIs are "5000" and "5011". The VNI resolver 1440 then parses (at operation '7') out the VNI "5000" and returns (at operation '8') this logical switch VNI back to the generic resolver 1410.

Having resolved the parameter {controller-id} and the parameter {vni}, the generic resolver 1410 creates the resolved command "show logical-switch controller controller-1 vni 5000 mac" and inserts (at operation '9') it into the command history cache 1195.

III. Adaptive Time-Out

One of the difficulties in using CTT (either as CLI or GUI) in a distributed system is that different connection channel to different physical endpoints may have different network timeout profiles. If the timeout is too long, user will be blocked for too long when there is connection issue at the channel between the CTT and the PE. If the timeout is too short, the user may receive false error report when the connection channel is merely slow. Such erroneous reporting may mislead users and result in incorrect analysis when troubleshooting the system.

Some embodiments provide a physical endpoint (PE) channel manager that maintains adaptive command timeout timers to accelerate user troubleshooting the distributed system. The physical endpoint channel manager updates the adaptive command timeout timer according to the response time of a heartbeat command. In some embodiments, the heartbeat command timeout timer is always set to the maximal response time. In some embodiments, the physical endpoint channel manager keeps the heartbeat to a physical endpoint active only when user mentions (e.g., at CLI) the physical endpoint recently or it is predicted that the user may mention the physical endpoint in the near future. In some embodiments, the physical endpoint channel manager keeps the heartbeat to a physical endpoint active when the user has recently mentioned the logical resources operating on the physical endpoint.

Figure 15:
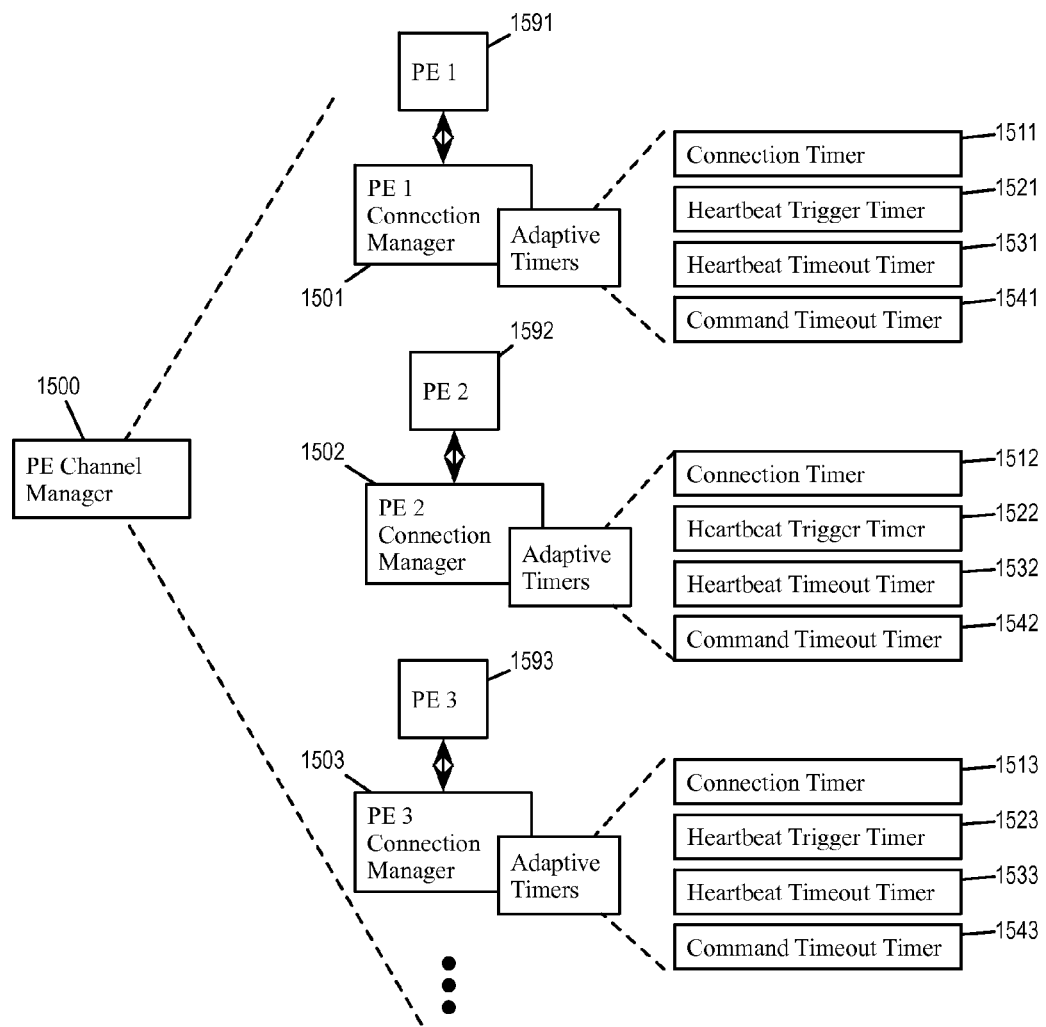
FIG. 15 illustrates the components of a PE channel manager that manages the connection with different PEs in the distributed system.

FIG. 15 illustrates the components of a PE channel manager 1500 that manages the connection with different PEs in the distributed system. As illustrated, the PE manager 1500 includes multiple connection managers 1501-1503, each connection manager managing the connection to one PE. The connection manager 1501 is for connecting to a PE 1591. The connection manager 1502 is for connecting to a PE 1592. The connection manager 1503 is for connecting to a PE 1593.

Each connection manager includes its own set of adaptive timers for managing the connection with its corresponding PE and for handing the user's experience when debugging the PE. As illustrated, each set of adaptive timers for a PE connection includes a connection timer, a heartbeat trigger timer, a heartbeat timeout timer, and a command timeout timer. (For example, the connection manager 1501 has a connection timer 1511, a heartbeat trigger timer 1521, a heartbeat timeout timer 1531, and a command timeout timer 1541).

In some embodiments, each connection manager periodically sends "heartbeat" commands to its corresponding PE to validate the connection between the CTT and the PE. (Some embodiments use a simplest command as the heartbeat command). The heartbeat trigger timer (e.g., 1521) sets the interval between two consecutive heartbeat commands and triggers the transmission of a heartbeat command when the timer reaches its timeout value/terminal count.

The heartbeat timeout timer (1531) controls how long should the connection manager wait for the PE to respond to the heartbeat before reporting heartbeat response timeout or heartbeat failure. In some embodiments, the heartbeat timeout timer is always set to the maximum possible time.

Each connection manager also determines when the CTT should report to the user that a particular command invoked through the CTT has failed or timed-out. The command timeout timer (e.g., 1541) controls when a user invoked command times out without receiving a response. The timeout value for the command timeout timer is adaptively determined/computed based on measured response times for the heartbeat commands.

The connection timer (e.g., 1511) controls whether the connection to the PE is maintained and whether the heartbeat trigger timer is active (i.e., whether the connection manager should keep sending PE the heartbeat command). The connection timer times out if the user of the user interface of the CTT does not invoke a command that require communication with the corresponding PE beyond certain amount of time (e.g., when the CLI does not mention the PE or an LR spanning the PE for that certain amount of time). If the connection timer for a PE times out, the PE channel manager would cease sending heartbeat command to the corresponding PE until the user again invokes a command that involves the PE.

Figure 16:
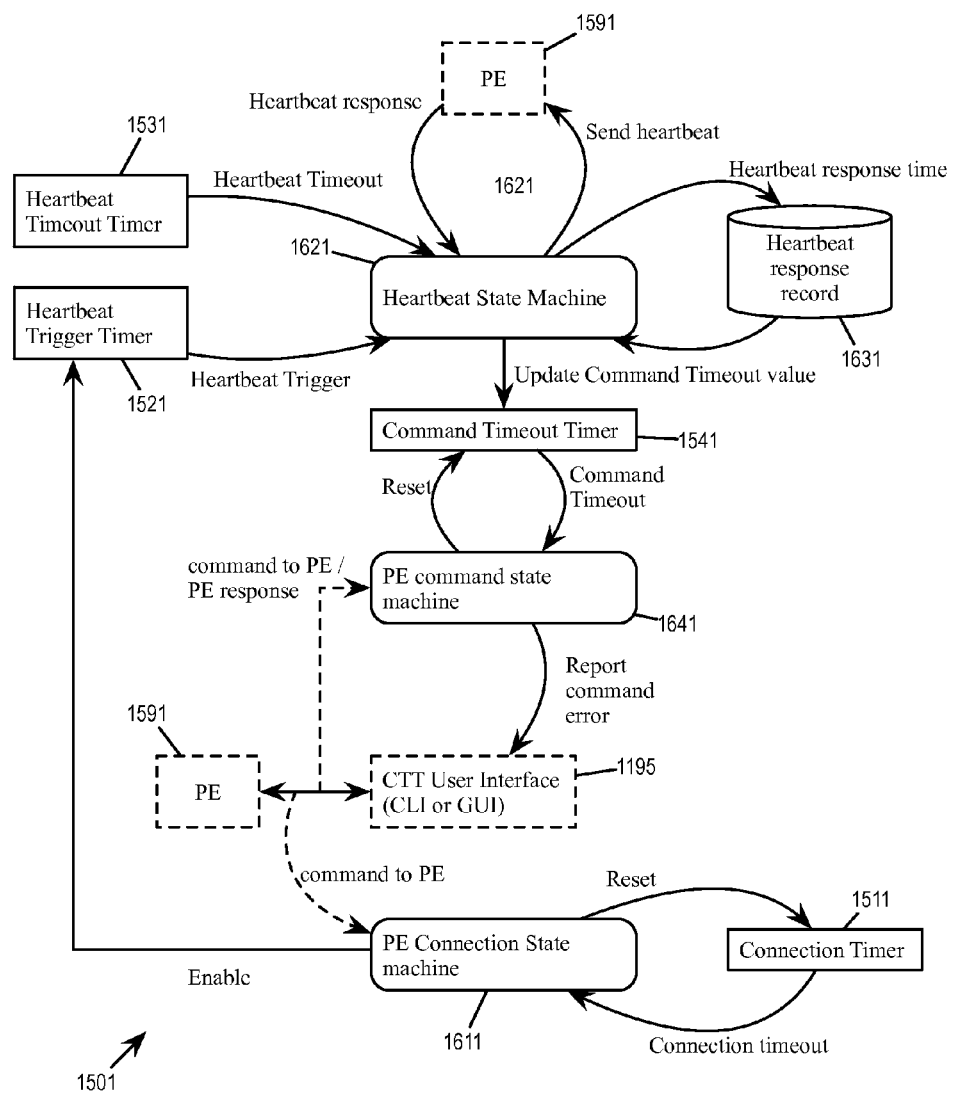
FIG. 16 illustrates the interactions between the various adaptive timers of a PE connection manager.

FIG. 16 illustrates the interactions between the various adaptive timers of a PE connection manager. Specifically, the figure illustrates the interactions in the PE connection manager 1501 (for the PE 1591) between the connection timer 1511, the heartbeat trigger timer 1521, the heartbeat timeout timer 1531, and the command timeout timer 1541. The PE connection manager 1501 also includes several state machines for controlling and using these adaptive timers to manage the connection with its corresponding PE 1591 and to handle the user interface 1195. These state machines include a heartbeat state machine 1621, a PE command state machine 1641, and a PE connection state machine 1611.

As illustrated, the heartbeat state machine 1621 periodically issues heartbeat command to the PE 1591 based on the heartbeat trigger generated by the heartbeat trigger timer 1521. The heartbeat state machine 1621 also receives the heartbeat response from the PE 1591 (except when the heartbeat timeout timer 1531 times out). The heartbeat response time is recorded or numerically accumulated in a heartbeat response record/storage 1631. The heartbeat state machine 1621 also updates the time out value of the command timeout timer 1541 according to the accumulated heartbeat response record (e.g., by a factor of the average of the recorded heartbeat response times) so that the time-out of a command to a PE is adjusted adaptively according to the PE's heartbeat response time. In some embodiments, the heartbeat timeout timer is always set to the maximum possible time (as allowed by the heartbeat timeout timer) in order to record as many valid samples of heartbeat response times as possible.

The PE command state machine 1641 determines whether a command to the PE 1591 has timed-out or not. It makes this determination based on the command timeout timer 1541, whose timeout time is adaptively set according to the heartbeat response times of the PE 1541. The PE command state machine 1641 monitors command for the PE 1591 by the CTT user interface 1195 and starts the command timeout timer 1541. The PE command state machine 1641 also monitors response from the PE 1591. If the response fail to arrive before the command timeout timer 1541 times out, the PE command state machine 1641 informs the user interface 1195 (and hence displayed to the user) that the command to the PE has failed/timed-out.

The PE connection state machine 1611 determines whether to keep the connection with the PE 1591 active by enabling/disabling heartbeat command to the PE 1591. The PE connection state machine 1611 keeps the heartbeat communication with the PE alive only if the user of the CTT has mentioned the PE recently. If the user does not mention the PE for too long period of time, the PE connection timer 1511 times out and the PE connection manager 1501 stops sending heartbeat to the PE 1591. When the user mentions the PE 1591, the PE connection state machine 1641 resets the connection timer 1511 and enables heartbeat.

Figure 17:
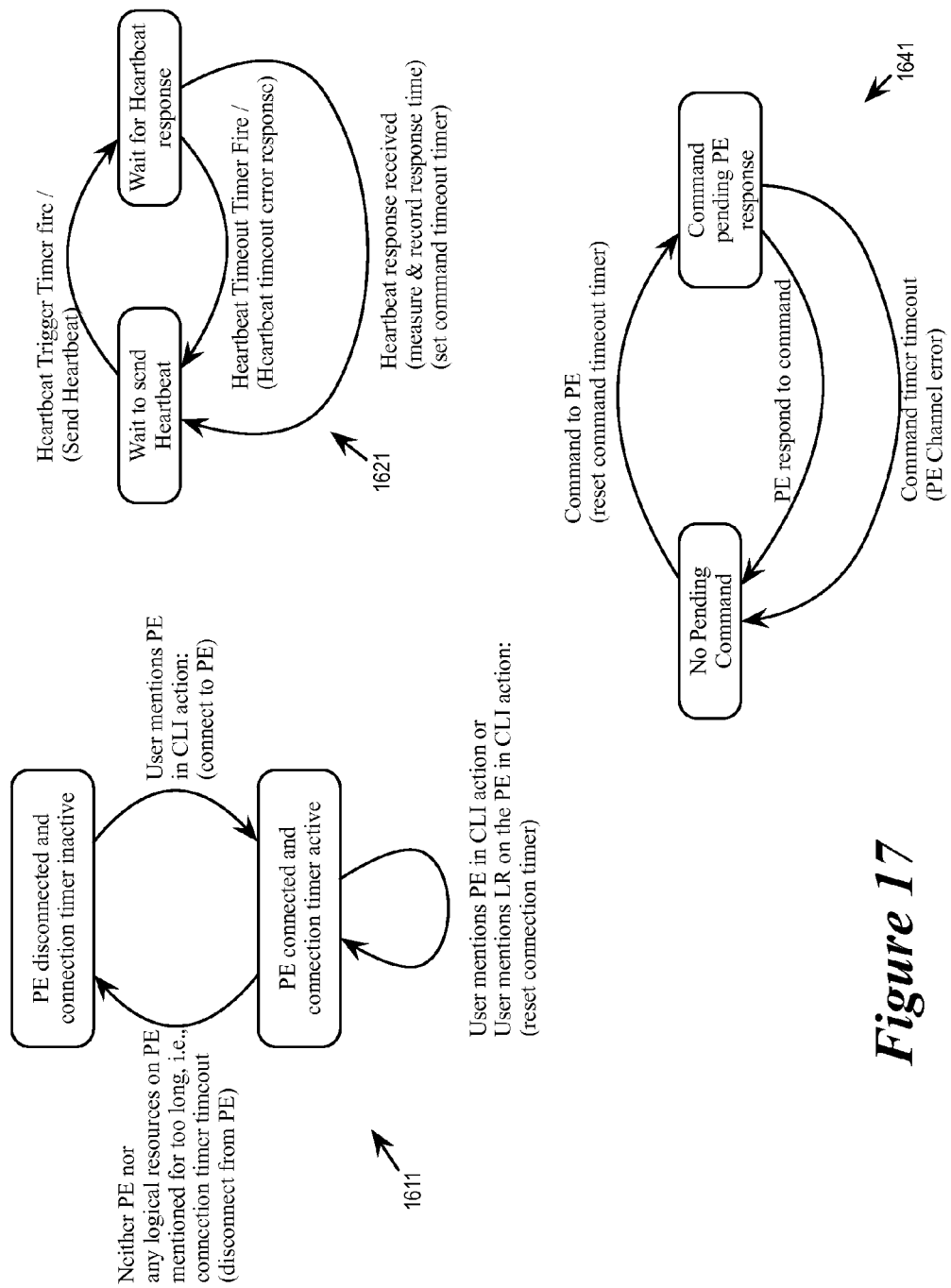
FIG. 17 conceptually illustrates the operations of the various state machines of a PE connection manager.

FIG. 17 conceptually illustrates the operations of the state machines in the PE connection manager 1501 (i.e., the PE connection state machine 1611, the heartbeat state machine 1621, and the PE command state machine 1641.)

The PE connection state machine 1611 has two states "PE disconnected" and "PE connected". During the PE disconnected state, connection timer is inactive, and the heartbeat trigger timer 1521 is also inactive so no heartbeat command will be issued to the PE. During the "PE connected" state, the connection timer is active and the CTT issues heartbeat to the PE. The state machine 1611 transitions to the "PE disconnected" state if the CTT does not mention the PE for a certain period of time (i.e., connection timer time-out). The state machine 1611 transitions to the "PE connected" state as soon as CTT mentions the PE (e.g., in CLI or GUI action).

The heartbeat state machine 1621 has two states "wait to send heartbeat" and "wait for heartbeat response". Whenever the heartbeat trigger timer fires, the state machine 1621 causes the CTT or the PE channel manager to send a heartbeat command to the PE, and the state machine itself transitions to the "wait for heartbeat response" state. When the CTT/PE channel manager receives the PE's response to the heartbeat command, the state machine 1621 record the response time of the PE and transitions back to the "wait to send heartbeat" state. The response time is used to adaptively adjust the command timer timeout interval. When the CTT/PE channel manager receives heartbeat timeout timer firing (i.e., heartbeat timeout), the state machine transitions back to the "wait to send heartbeat state".

The PE command state machine 1641 has two states "no pending commands" and "command pending PE response". As mentioned, the state machine 1641 monitors the commands being issued by the user interface 1195. Whenever the state machine 1641 detects a command being issued to the PE 1591 by the user interface 1195, the state machine 1641 resets the command timeout timer 1541 and transitions to the "command pending PE response" state. The reset sets the command timeout timer 1541 to a value that is determined by the accumulated heartbeat response time (as determined by the heartbeat state machine 1621). When the state machine 1641 detects the PE's response to the command, it transitions back to the "No pending command" state. If the command timer (1541) timeout has fired while the state machine 1641 is in "command pending PE response" state (i.e., the PE has not responded to the command before the command timer 1541 times out), the state machine 1641 reports PE channel error, so the user of the CTT knows that the PE has failed to respond to the command. However, since this timeout interval is adaptively determined based on the accumulated heartbeat response time, this PE channel error report is far less likely to be false.

IV. Computing Device & Virtualization Software

Figure 18:
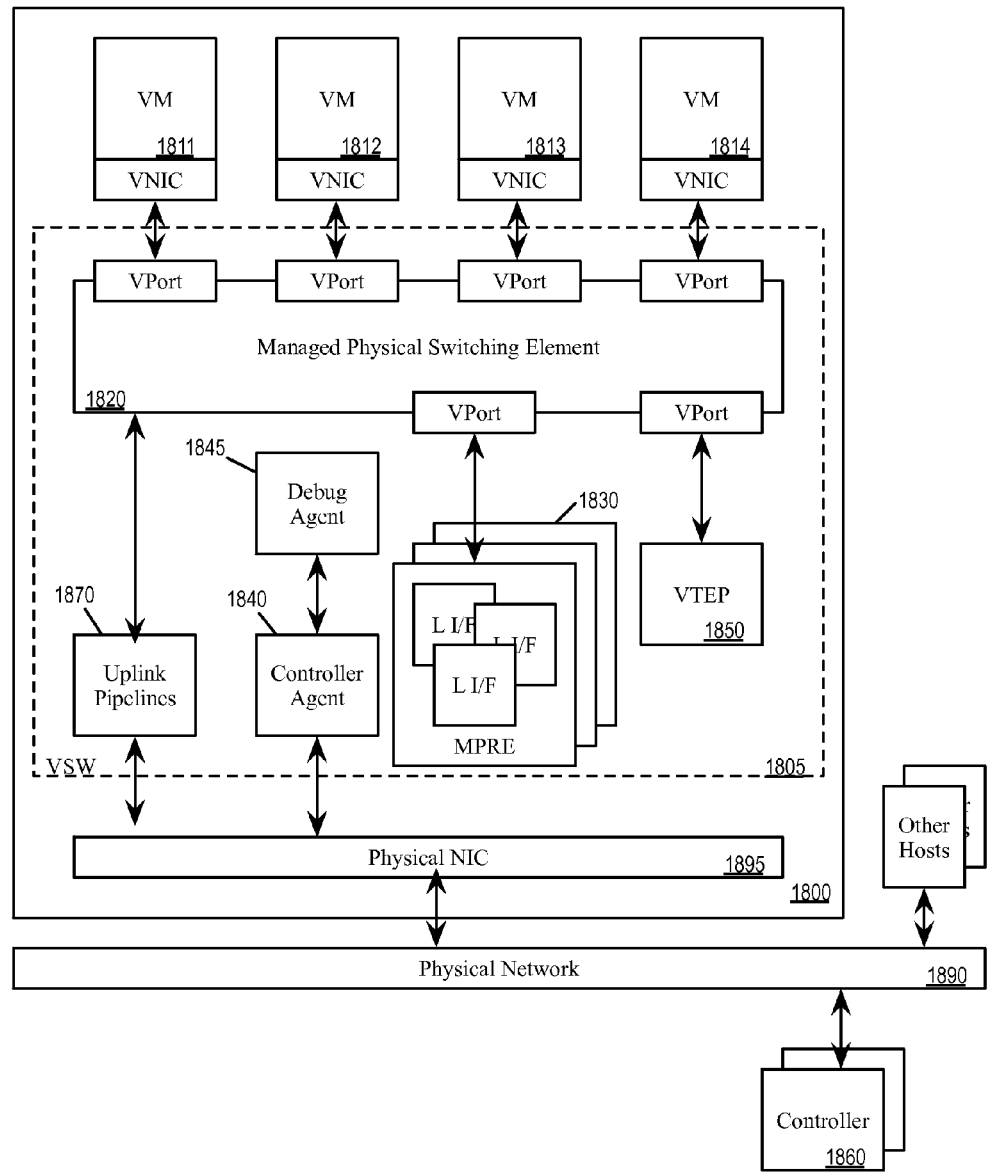
FIG. 18 illustrates a computing device that serves as a host machine.

FIG. 18 illustrates a computing device 1800 that serves as a host machine (or host physical endpoint) for some embodiments of the invention. The computing device 1800 is running virtualization software that implements a physical switching element and a set of physical routing elements. (i.e., MPSE and MPREs).

As illustrated, the computing device 1800 has access to a physical network 1890 through a physical NIC (PNIC) 1895. The host machine 1800 also runs the virtualization software 1805 and hosts VMs 1811-1814. The virtualization software 1805 serves as the interface between the hosted VMs and the physical NIC 1895 (as well as other physical resources, such as processors and memory). Each of the VMs includes a virtual NIC (VNIC) for accessing the network through the virtualization software 1805. Each VNIC in a VM is responsible for exchanging packets between the VM and the virtualization software 1805. In some embodiments, the VNICs are software abstractions of physical NICs implemented by virtual NIC emulators.

The virtualization software 1805 manages the operations of the VMs 1811-1814, and includes several components for managing the access of the VMs to the physical network (by implementing the logical networks to which the VMs connect, in some embodiments). As illustrated, the virtualization software includes several components, including a MPSE 1820, a set of MPREs 1830, a controller agent 1840, a debug agent 1845, a VTEP 1850, and a set of uplink pipelines 1870.

The VTEP (VXLAN tunnel endpoint) 1850 allows the host machine 1800 to serve as a tunnel endpoint for logical network traffic (e.g., VXLAN traffic). VXLAN is an overlay network encapsulation protocol. An overlay network created by VXLAN encapsulation is sometimes referred to as a VXLAN network, or simply VXLAN. When a VM on the host 1800 sends a data packet (e.g., an ethernet frame) to another VM in the same VXLAN network but on a different host, the VTEP will encapsulate the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The VTEP at the destination host decapsulates the packet and forwards only the original inner data packet to the destination VM. In some embodiments, the VTEP module serves only as a controller interface for VXLAN encapsulation, while the encapsulation and decapsulation of VXLAN packets is accomplished at the uplink module 1870.

The controller agent 1840 receives control plane messages from a controller or a cluster of controllers. In some embodiments, these control plane message includes configuration data for configuring the various components of the virtualization software (such as the MPSE 1820 and the MPREs 1830) and/or the virtual machines. In the example illustrated in FIG. 18, the controller agent 1840 receives control plane messages from the controller cluster 1860 from the physical network 1890 and in turn provides the received configuration data to the MPREs 1830 through a control channel without going through the MPSE 1820. However, in some embodiments, the controller agent 1840 receives control plane messages from a direct data conduit (not illustrated) independent of the physical network 1890. In some other embodiments, the controller agent receives control plane messages from the MPSE 1820 and forwards configuration data to the router 1830 through the MPSE 1820.

The debug agent 1845 handles message exchange (for the computing device 1800 as a PE) with the central troubleshooting tool (CTT) operated by the network manager. The debug agent 1845 provides status and control of the various components of the virtualization software 1805 to the CTT through these messages with the network manager.

The MPSE 1820 delivers network data to and from the physical NIC 1895, which interfaces the physical network 1890. The MPSE also includes a number of virtual ports (vPorts) that communicatively interconnects the physical NIC with the VMs 1811-1814, the MPREs 1830 and the controller agent 1840. Each virtual port is associated with a unique L2 MAC address, in some embodiments. The MPSE performs L2 link layer packet forwarding between any two network elements that are connected to its virtual ports. The MPSE also performs L2 link layer packet forwarding between any network element connected to any one of its virtual ports and a reachable L2 network element on the physical network 1890 (e.g., another VM running on another host). In some embodiments, a MPSE is a local instantiation of a logical switching element (LSE) that operates across the different host machines and can perform L2 packet switching between VMs on a same host machine or on different host machines. In some embodiments, the MPSE performs the switching function of several LSEs according to the configuration of those logical switches.

The MPREs 1830 perform L3 routing on data packets received from a virtual port on the MPSE 1820. In some embodiments, this routing operation entails resolving L3 IP address to a next-hop L2 MAC address and a next-hop VNI (i.e., the VNI of the next-hop's L2 segment). Each routed data packet is then sent back to the MPSE 1820 to be forwarded to its destination according to the resolved L2 MAC address. This destination can be another VM connected to a virtual port on the MPSE 1820, or a reachable L2 network element on the physical network 1890 (e.g., another VM running on another host, a physical non-virtualized machine, etc.).

As mentioned, in some embodiments, a MPRE is a local instantiation of a logical routing element (LRE) that operates across the different host machines and can perform L3 packet forwarding between VMs on a same host machine or on different host machines. In some embodiments, a host machine may have multiple MPREs connected to a single MPSE, where each MPRE in the host machine implements a different LRE. MPREs and MPSEs are referred to as "physical" routing/switching element in order to distinguish from "logical" routing/switching elements, even though MPREs and MPSE are implemented in software in some embodiments. In some embodiments, a MPRE is referred to as a "software router" and a MPSE is referred to a "software switch". In some embodiments, LREs and LSEs are collectively referred to as logical forwarding elements (LFEs), while MPREs and MPSEs are collectively referred to as managed physical forwarding elements (MPFEs). Some of the logical resources (LRs) mentioned throughout this document are LREs or LSEs that have corresponding local MPREs or local MPSE running in each host machine.

In some embodiments, the MPRE 1830 includes one or more logical interfaces (LIFs) that each serves as an interface to a particular segment (L2 segment or VXLAN) of the network. In some embodiments, each LIF is addressable by its own IP address and serve as a default gateway or ARP proxy for network nodes (e.g., VMs) of its particular segment of the network. In some embodiments, all of the MPREs in the different host machines are addressable by a same "virtual" MAC address (or vMAC), while each MPRE is also assigned a "physical" MAC address (or pMAC) in order indicate in which host machine does the MPRE operate.

The uplink module 1870 relays data between the MPSE 1820 and the physical NIC 1895. The uplink module 1870 includes an egress chain and an ingress chain that each performs a number of operations. Some of these operations are pre-processing and/or post-processing operations for the MPRE 1830. The operations of LIFs, uplink module, MPSE, and MPRE are described in U.S. patent application Ser. No. 14/137,862 filed on Dec. 20, 2013, titled "Logical Router", published as U.S. Patent Application Publication 2015/0106804.

As illustrated by FIG. 18, the virtualization software 1805 has multiple MPREs for multiple different LREs. In a multi-tenancy environment, a host machine can operate virtual machines from multiple different users or tenants (i.e., connected to different logical networks). In some embodiments, each user or tenant has a corresponding MPRE instantiation of its LRE in the host for handling its L3 routing. In some embodiments, though the different MPREs belong to different tenants, they all share a same vPort on the MPSE 1820, and hence a same L2 MAC address (vMAC or pMAC). In some other embodiments, each different MPRE belonging to a different tenant has its own port to the MPSE.

The MPSE 1820 and the MPRE 1830 make it possible for data packets to be forwarded amongst VMs 1811-1814 without being sent through the external physical network 1890 (so long as the VMs connect to the same logical network, as different tenants' VMs will be isolated from each other). Specifically, the MPSE performs the functions of the local logical switches by using the VNIs of the various L2 segments (i.e., their corresponding L2 logical switches) of the various logical networks. Likewise, the MPREs perform the function of the logical routers by using the VNIs of those various L2 segments. Since each L2 segment/L2 switch has its own a unique VNI, the host machine 1800 (and its virtualization software 1805) is able to direct packets of different logical networks to their correct destinations and effectively segregates traffic of different logical networks from each other.

V. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 19:
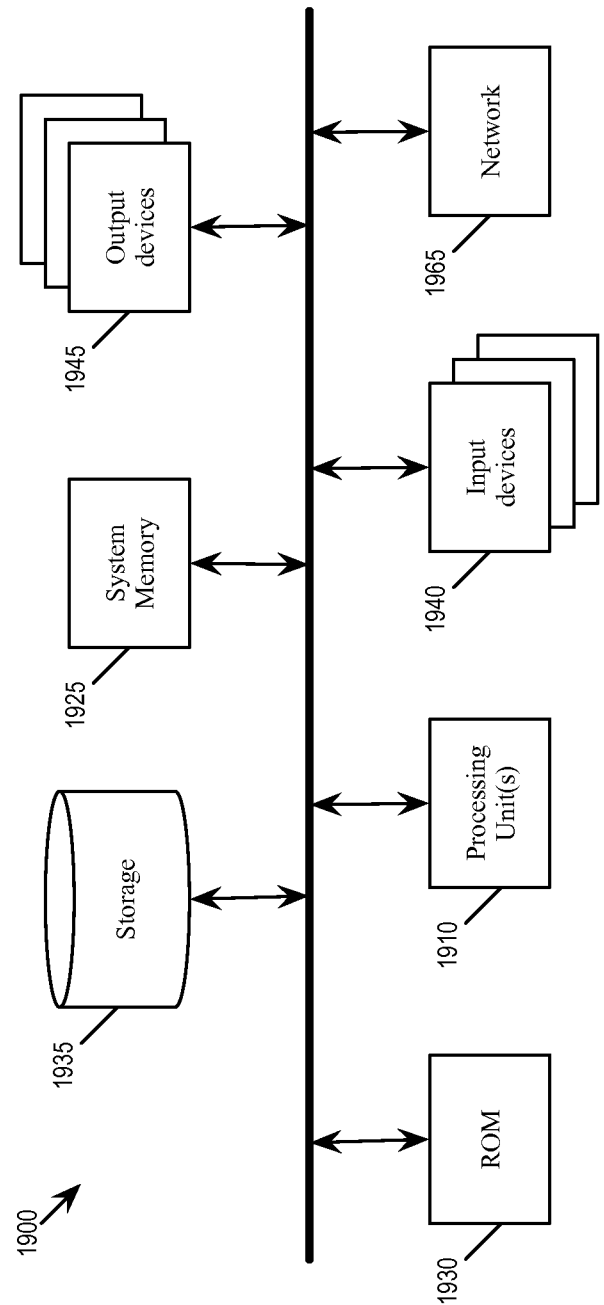
FIG. 19 conceptually illustrates an electronic system with which some embodiments of the invention are implemented.

FIG. 19 conceptually illustrates an electronic system 1900 with which some embodiments of the invention are implemented. The electronic system 1900 can be used to execute any of the control, virtualization, or operating system applications described above. The electronic system 1900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1900 includes a bus 1905, processing unit(s) 1910, a system memory 1925, a read-only memory 1930, a permanent storage device 1935, input devices 1940, and output devices 1945.

The bus 1905 collectively represents all system, peripheral, and chipset buses that communicatively connect the numerous internal devices of the electronic system 1900. For instance, the bus 1905 communicatively connects the processing unit(s) 1910 with the read-only memory 1930, the system memory 1925, and the permanent storage device 1935.

From these various memory units, the processing unit(s) 1910 retrieves instructions to execute and data to process in order to execute the processes of the invention. The processing unit(s) may be a single processor or a multi-core processor in different embodiments.

The read-only-memory (ROM) 1930 stores static data and instructions that are needed by the processing unit(s) 1910 and other modules of the electronic system. The permanent storage device 1935, on the other hand, is a read-and-write memory device. This device is a non-volatile memory unit that stores instructions and data even when the electronic system 1900 is off. Some embodiments of the invention use a mass-storage device (such as a magnetic or optical disk and its corresponding disk drive) as the permanent storage device 1935.

Other embodiments use a removable storage device (such as a floppy disk, flash drive, etc.) as the permanent storage device. Like the permanent storage device 1935, the system memory 1925 is a read-and-write memory device. However, unlike storage device 1935, the system memory is a volatile read-and-write memory, such a random access memory. The system memory stores some of the instructions and data that the processor needs at runtime. In some embodiments, the invention's processes are stored in the system memory 1925, the permanent storage device 1935, and/or the read-only memory 1930. From these various memory units, the processing unit(s) 1910 retrieves instructions to execute and data to process in order to execute the processes of some embodiments.

The bus 1905 also connects to the input and output devices 1940 and 1945. The input devices enable the user to communicate information and select commands to the electronic system. The input devices 1940 include alphanumeric keyboards and pointing devices (also called "cursor control devices"). The output devices 1945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 19, bus 1905 also couples electronic system 1900 to a network 1965 through a network adapter (not shown). In this manner, the computer can be a part of a network of computers (such as a local area network ("LAN"), a wide area network ("WAN"), or an Intranet, or a network of networks, such as the Internet. Any or all components of electronic system 1900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

In this document, the term "packet" refers to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 9 and 13) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for troubleshooting a network comprising a plurality of physical endpoints implementing a set of logical resources, at least one logical resource spanning a plurality of the physical endpoints, the method comprising:
   at a network manager for the network:
      providing a command line interface (CLI) for troubleshooting the network, the CLI comprising a command history cache for storing previously invoked commands that can be reused;
      receiving a troubleshooting command for the CLI, the troubleshooting command comprising a set of unresolved parameters;
      in response to receiving the troubleshooting command (i) identifying a set of parameters for each unresolved parameter and (ii) generating from the received troubleshooting command a set of troubleshooting commands, each generated troubleshooting command of the set comprising an action referenced by the received troubleshooting command and having at least one resolved parameter in place of each unresolved parameter, at least one of the resolved parameters identifying a physical endpoint or a logical resource in the network as a target for the command; and
      inserting the generated set of troubleshooting commands into the command history cache for a subsequent selection and invocation of a troubleshooting command of the generated set of troubleshooting commands through the CLI.

2. The method of claim 1 further comprising configuring the CLI according to CLI configuration data, wherein the set of troubleshooting commands is generated according to specification provided by the CLI configuration data.

3. The method of claim 2 further comprising preloading the command history cache with a set of preloaded commands that are specified by the CLI configuration data, wherein the received troubleshooting command is one of the preloaded commands.

4. The method of claim 1, wherein the network manager is a computing device serving as a network manager for the network.

5. The method of claim 4, wherein the received troubleshooting command is received from a user interface of the network manager, wherein the user interface comprises the CLI.

6. The method of claim 1, wherein the received troubleshooting command is a command prototype comprising at least one unresolved identity parameter to be replaced by at least one parameter for identifying target network physical endpoints or logical resources and at least one unresolved non-identity parameter to be replaced by at least one parameter for specifying an action.

7. The method of claim 1, wherein identifying a set of parameters for each unresolved parameter comprises executing a set of dependent commands.

8. The method of claim 7, wherein executing a dependent command comprises invoking the dependent command at the CLI and parsing the response from the network to the invoked command to identify a set of parameters for an unresolved parameter.

9. The method of claim 1, wherein the plurality of physical endpoints of the network comprises computing devices that serve as host machines, controllers, and edge appliances.

10. A system comprising:
a plurality of physical endpoints interconnected by a network, wherein the plurality of physical endpoints jointly operates a set of logical resources, at least one logical resource spanning a plurality of the physical endpoints;
a network manager operating a user interface and a centralized troubleshooting tool, wherein the centralized troubleshooting tool comprises a command line interface (CLI) for troubleshooting the network, wherein the CLI comprises a command history cache for storing previously invoked commands that can be reused, wherein the network manager is configured to:
receive a troubleshooting command for the CLI, the troubleshooting command comprising a set of unresolved parameters;
in response to receiving the troubleshooting command, (i) identify a set of parameters for each unresolved parameter and (ii) generate from the received troubleshooting command a set of troubleshooting commands, each generated troubleshooting command of the set comprising an action referenced by the received troubleshooting command and having at least one resolved parameter in place of each unresolved parameter, at least one of the resolved parameters identifying a physical endpoint or a logical resource in the network as a target for the command; and
insert the generated set of troubleshooting commands into the command history cache for a subsequent selection and invocation of a troubleshooting command of the generated set of troubleshooting commands through the CLI.

11. The system of claim 10, wherein the CLI is configured according to CLI configuration data, wherein the network manager generates the set of troubleshooting commands according to specification provided by the CLI configuration data.

12. The system of claim 11, wherein the network manager preloads the command history cache with a set of preloaded commands that are specified by the CLI configuration data, wherein the received troubleshooting command is one of the preloaded commands.

13. The system of claim 10, wherein the received command is a command prototype comprising at least one unresolved identity parameter to be replaced by at least one parameter for identifying target network physical endpoints or logical resources and at least one unresolved non-identity parameter to be replaced by at least one parameter for specifying an action.

14. The system of claim 10, wherein the plurality of physical endpoints interconnected by the network comprises computing devices that serve as host machines, controllers, and edge appliances.

15. A non-transitory machine readable medium storing a network manager program that when executed by at least one processing unit troubleshoots a network comprising a plurality of physical endpoints implementing a set of logical resources, at least one logical resource spanning a plurality of the physical endpoints, the program comprising sets of instructions for:
providing a command line interface (CLI) for troubleshooting the network, the CLI comprising a command history cache for storing previously invoked commands that can be reused;
receiving a troubleshooting command for the CLI, the troubleshooting command comprising a set of unresolved parameters;
in response to receiving the troubleshooting command i) identifying a set of parameters for each unresolved parameter and (ii) generating from the received troubleshooting command a set of troubleshooting commands, each generated troubleshooting command of the set comprising an action referenced by the received troubleshooting command and having at least one resolved parameter in place of each unresolved parameter, at least one of the resolved parameters identifying a physical endpoint or a logical resource in the network as a target for the command; and
inserting the generated set of troubleshooting commands into the command history cache for a subsequent selection and invocation of a troubleshooting command of the generated set of troubleshooting commands through the CLI.

16. The non-transitory machine readable medium of claim 15, wherein the CLI is configured according to CLI configuration data, wherein the set of instruction for generating the set of troubleshooting commands comprises a set of instruction for generating the commands according to specification provided by the CLI configuration data.

17. The non-transitory machine readable medium claim 16, the program further comprising a set of instructions for preloading the command history cache with a set of preloaded commands that are specified by the CLI configuration data, wherein the received troubleshooting command is one of the preloaded commands.

18. The non-transitory machine readable medium of claim 15, wherein the network manager program is executed at a computing device serving as a network manager for the network.

19. The non-transitory machine readable medium of claim 15, wherein the received troubleshooting command is a command prototype comprising a at least one unresolved identity parameter to be replaced by at least one parameter for identifying target network physical endpoints or logical resources and at least one unresolved non-identity parameter to be replaced by at least one parameter for specifying an action.

20. The non-transitory machine readable medium of claim 15, wherein the set of instructions for identifying a set of parameters for each unresolved parameter comprises a set of instructions for executing a set of dependent commands.

21. The non-transitory machine readable medium of claim 20, wherein the set of instructions for executing a dependent command comprises a set of instructions for invoking the dependent command at the CLI and a set of instructions for parsing the response from the network to the invoked command to identify a set of parameters for an unresolved parameter.

22. The method of claim 3, further comprising invoking at the CLI a generated troubleshooting command selected at the CLI from the generated set of troubleshooting commands.

23. The method of claim 1, wherein at least one of the resolved parameters identifies one of a logical switch and a logical router.

\* \* \* \* \*